(12) United States Patent
Kamiyama et al.

(10) Patent No.: US 6,744,969 B1
(45) Date of Patent: Jun. 1, 2004

(54) DATA RECORDING AND REPRODUCING APPARATUS AND DATA EDITING METHOD

(75) Inventors: Kazuo Kamiyama, Kanagawa (JP);
Makoto Tabuchi, Kanagawa (JP);
Masakazu Murata, Kanagawa (JP);
Shinichi Morishima, Kanagawa (JP);
Yoshiharu Yamashita, Kanagawa (JP);
Ichiro Fujisawa, Kanagawa (JP);
Hiroshi Masuda, Kanagawa (JP);
Tatsuo Tsukida, Kanagawa (JP);
Yoshizo Mihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/435,964

(22) Filed: Nov. 8, 1999

(30) Foreign Application Priority Data

| Nov. 10, 1998 | (JP) | ............................................. | 10-319037 |
| Nov. 10, 1998 | (JP) | ............................................. | 10-334998 |
| Nov. 10, 1998 | (JP) | ............................................. | 10-334999 |
| Nov. 10, 1998 | (JP) | ............................................. | 10-335001 |

(51) Int. Cl.$^7$ .............................. H04N 5/93; H04N 5/85
(52) U.S. Cl. ........................................ 386/52; 386/125
(58) Field of Search ............................. 386/52, 55, 53, 386/125, 124, 126, 45, 46, 4, 40, 107, 117, 64; 760/13; H04N 5/93, 5/85

(56) References Cited

U.S. PATENT DOCUMENTS 5,126,851 A * 6/1992 Yoshimura et al.
5,237,648 A * 8/1993 Mills et al.

* cited by examiner

Primary Examiner—Robert Chevalier
(74) Attorney, Agent, or Firm—Frommer Lawrence & Haug LLP; William S. Frommer; Gordon Kessler

(57) ABSTRACT

A data recording and reproducing apparatus has facilities for recording and reproducing, inputting and outputting, and editing data and can perform edits by itself. The data recording and reproducing apparatus records AV data inputted from an input port on HDDs by using a recorder and reproducer, and outputs data reproduced from HDDs by the recorder and reproducer through an output port. In an editor inputted is data inputted from outside and data reproduced by the recorder and reproducer. The editor performs edits on at least either of the data above by using a matrix switcher and an audio mixer provided therein. A special effector is utilized as necessary. The editor can output data obtained through editing processing to a switch.

45 Claims, 24 Drawing Sheets

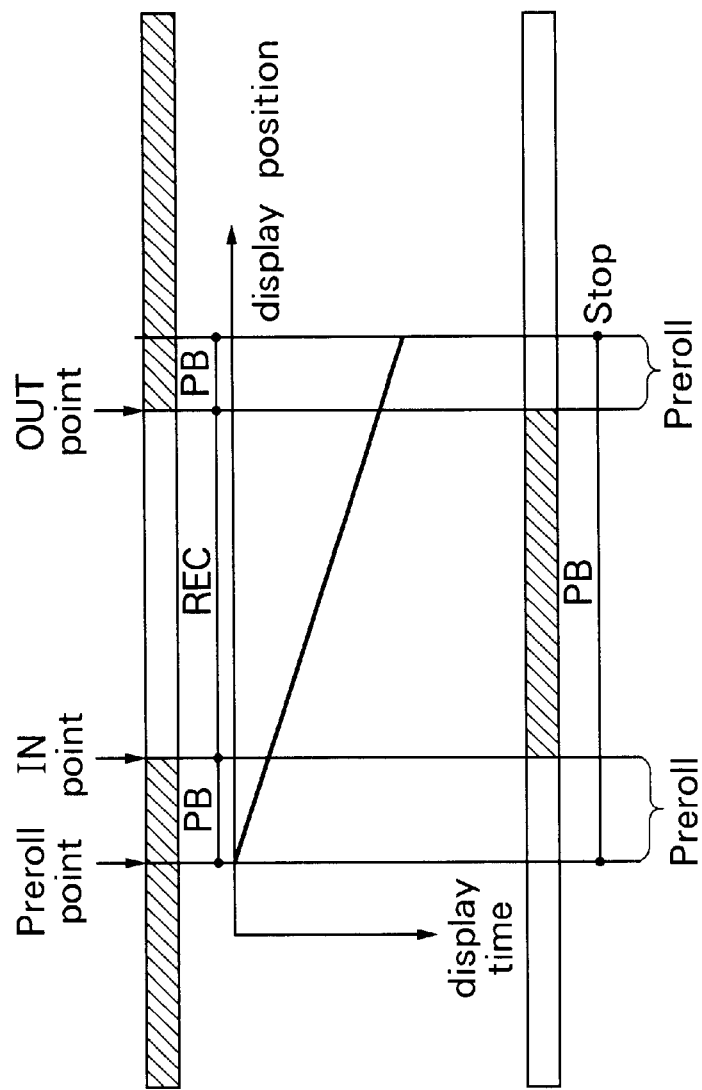

record entry of original material record entry of insert material record entry of original material

DATA RECORDING AND REPRODUCING APPARATUS AND DATA EDITING METHOD

BACKGROUND OF THE INVENTION

1. Field of the Invention

The invention relates to a data recording and reproducing apparatus for recording and/or reproducing data and data editing method. More particularly, the invention relates to a data recording and reproducing apparatus and data editing method suitable for recording, reproducing and editing of video and audio data.

2. Description of the Related Art

In recent years, in accordance with multi-channeling for providing information due to the spread of a CATV (cable television) or the like, there has been a growing demand to simultaneously record, reproduce, or record and reproduce ha plurality of video and audio data with one video and audio data recording and reproducing apparatus, as distinct from a conventional VCR (Video Cassette Recorder). In response to this demand, an apparatus called a video server (also called an AV (Audio and/or Video) server) for recording and reproducing video and audio data by using a random-accessible recording medium such as a hard disk is coming into a widespread use.

Generally, video servers in broadcast stations require a high transfer rate of data and a large capacity for recording data over a long period of time, because of the demands on image quality and sound quality. Attempts have been therefore made to increase data transfer rate and capacity by using a data recording and reproducing apparatus including a plurality of hard disk (hereinafter referred to as HD) drives capable of storing the video and audio data and of performing parallel processing. Further attempts have been made to ensure reliability by previously recording parity data in case of trouble in any of the HD drives. It is thus possible to realize a multi-channel video server having various applications: for example, even when the number of channels required varies depending on the contents and broadcast form of a program which a broadcast station intends to provide, material data composed of a plurality of audio and video data is previously recorded separately and then multi-channel transmission is performed simultaneously, or the same material data is reproduced on multi-channel by shifting a reproducing time, whereby a system such as a VOD (Video On Demand) or an NVOD (Near Video On Demand) is established.

A data recording and reproducing apparatus for such a video server utilizes the technology of RAID (Redundant Arrays of Inexpensive Disks) comprising a plurality of hard disk drives (hereinafter referred to as HDDs), each HDD including a plurality of HDs, which is proposed in an article by Patterson et al., published in 1988 ("A Case for Redundant Arrays of Inexpensive Disks (RAID)", ACM SIGMOND Conference, Chicago, Ill., Jun. 1–3, 1988).

In this article, the RAID is classified into five types, RAID-1 to RAID-5. The RAID-1 is a type of RAID which writes the same content onto two HDDs. The RAID-3 is a type of RAID which divides input data into the data having a fixed length and records the data on a plurality of HDDs while generating parity data that is exclusive OR of corresponding data blocks in the HDDs and writing the parity data onto another HDD. The RAID-5 is a type of RAID which divides data into a larger unit (block) and records one divided data on one HDD in the form of the data block while recording a result (parity data) of exclusive OR of corresponding data blocks in the HDDs on other HDDs in the form of a parity block and distributing the parity block to other HDDs.

For other RAIDs, refer to the above-described article.

On the other hand, materials for actual use in a news program, a sports program and so on are subjected to processing such as editing in a broadcast station, and then processed materials are transmitted. Particularly for the transmission of urgent materials for news programs, materials for sports programs in cases of an extension of a game time, or the like, reduction in an editing time is desired.

In a typical editing processing, an editing machine is connected to VCRs. Materials to be transmitted are selected while materials reproduced by a VCR for reproducing are checked by the editing machine. Selected materials are recorded by a VCR for recording, and then a recorded tape is transmitted from a VCR for transmission.

In an attempt to reduce an editing time, nonlinear editing is also performed nowadays. For example, an AV server described above is connected to an editing machine. Materials stored in the AV server are reproduced and materials to be transmitted are selected in the editing machine. Then materials to be transmitted stored in the AV server are transmitted in accordance with edit point information (also called EDL: Edit Decision List). Nonlinear editing, as distinct from linear editing by a conventional VCR or the like, enables an immediate search for a desired material and enhances free access to and reproduction of a desired material even if materials stored in the AV server are not in chronological order.

However, nonlinear editing also has a problem that an editing machine, aside from an AV server, has to be provided in a broadcast station and thus additional space for an editing machine is required. This is a serious problem for, particularly, a relay car having a limited space. Also, in order to give special effects on materials to be transmitted, it is necessary to further install a special effect apparatus separately.

Moreover, few editors are, in fact, accustomed to the operation of the above-described nonlinear editing. Even in actual broadcast stations, linear editing using tapes as a medium has been heretofore performed and many editors are accustomed to linear editing.

Furthermore, nonlinear editing by using an AV server and an editing machine has another problem: for example, even simple cutting can not be done instantaneously due to time division control of storage media of an AV server. An AV server comprises a plurality of channels (a plurality of I/Os). Each channel makes time division access to HDDs in order to arbitrate use of the HDDs that are recording media, or in order to arbitrate use of internal buses connected to the HDDs. This time division control results in a certain amount of loss of time until materials are transmitted in response to a command from the editing machine. The loss of time is considered as one cause of inconvenience of operation for editors.

SUMMARY OF THE INVENTION

The present invention has been made in order to solve the above-described problems. It is therefore an object of the invention to provide a data recording and reproducing apparatus which has facilities for recording and reproducing, inputting and outputting, and editing data and can perform edits by itself.

It is another object of the invention to provide a data recording and reproducing apparatus which can easily check an operating status of the apparatus.

It is still another object of the invention to provide a data recording and reproducing apparatus which can instantaneously perform edits.

It is a further object of the invention to provide a data recording and reproducing apparatus which has facilities for recording and reproducing data, inputting and outputting data, and giving special effects on data and can give special effects by itself.

It is a further object of the invention to realize the operability of nonlinear editing similar to that of conventional linear editing.

It is another object of the invention to provide a data editing method through the use of the data recording and reproducing apparatus according to the invention.

A data recording and reproducing apparatus of the present invention comprises: recording and reproducing means for recording and reproducing data by using a nonlinear-accessible recording medium; input and output means having at least one input port for inputting data and at least one output port for outputting data, the input and output means being capable of making time division access to the recording and reproducing means; and editing means for editing data by using at least either data inputted from the input port or data reproduced by the recording and reproducing means.

Another data recording and reproducing apparatus of the present invention comprises: recording and reproducing means for recording and reproducing data by using a nonlinear-accessible recording medium; input and output means having at least one input port to which data reproduced by external equipment is inputted and at least one output port for outputting data, the input and output means being capable of making time division access to the recording and reproducing means; editing means for editing data by using at least either data inputted from the input port or data reproduced by the recording and reproducing means; and controlling means for controlling the external equipment or the recording medium so as to advance the time to reproduce data from the external equipment or the recording medium, in consideration of a magnitude of delay that occurs until, data reproduced by the external equipment or the recording medium is inputted to the editing means, from the time in a case in which the magnitude of delay is not taken in consideration, when the editing means edits data by using data inputted from the input port and data reproduced by the recording and reproducing means.

Still another data recording and reproducing apparatus of the present invention comprises: recording and reproducing means for recording and reproducing data by using a nonlinear-accessible recording medium; input and output means having at least one input port to which data reproduced by external equipment is inputted and at least one output port for outputting data, the input and output means being capable of making time division access to the recording and reproducing means; editing means for editing data by using at least either data inputted from the input port or data reproduced by the recording and reproducing means; and routing means for switching input and output routes for data inputted from the input port and data reproduced by the recording and reproducing means in accordance with the effect of editing, wherein the routing means has a cutting portion for selecting and cutting data inputted from the input port and data reproduced by the recording and reproducing means.

A further data recording and reproducing apparatus of the present invention comprises: recording and reproducing means for recording and reproducing data by using a nonlinear-accessible recording medium; input and output means having at least one input port for inputting data and at least one output port for outputting data, the input and output means being capable of making time division access to the recording and reproducing means; editing means for editing data by using at least either data inputted from the input port or data reproduced by the recording and reproducing means; routing means for switching input and output routes for data inputted from the input port and data reproduced by the recording and reproducing means in accordance with the effect of editing; and special effect processing means for applying special effect processing to input data, wherein the routing means has a data selector for selectively supplying data inputted from the input port and data reproduced by the recording and reproducing means to the special effect processing means.

A further data recording and reproducing apparatus of the present invention comprises: recording and reproducing means for recording and reproducing data by using a nonlinear-accessible recording medium; input and output means having at least one input port for inputting data and at least one output port for outputting data, the input and output means being capable of making time division access to the recording and reproducing means; editing means for editing data by using at least either data inputted from the input port or data reproduced by the recording and reproducing means; routing means for switching input and output routes for data inputted from the input port and data reproduced by the recording and reproducing means in accordance with the effect of editing; and image display means for displaying an image in accordance with input data, wherein the routing means has a data selector for selectively supplying data inputted from the input port and data reproduced by the recording and reproducing means to the image display means.

A further data recording and reproducing apparatus of the present invention comprises: recording and reproducing means for recording and reproducing data by using a nonlinear-accessible recording medium; input and output means having at least one input port for inputting data and at least one output port for outputting data, the input and output means being capable of making time division access to the recording and reproducing means; editing means for editing data by using at least either data inputted from the input port or data reproduced by the recording and reproducing means; and controlling means for controlling the recording and reproducing means so that data to be edited recorded on the recording medium may be reproduced in real time near a switching point at which data to be edited is switched and so that data to be edited may be reproduced in a time shorter than the real time at other sections than the section near the switching point, when the editing means edits data by using first and second data reproduced from the recording medium.

A data editing method according to the present invention is a data editing method through the use of a data recording and reproducing apparatus comprising: recording and reproducing means for recording and reproducing data by using a nonlinear-accessible recording medium; input and output means having at least one input port for inputting data and at least one output port for outputting data, the input and output means being capable of making access to the recording and reproducing means; and editing means for editing data by using at least either data inputted from the input port or data reproduced by the recording and reproducing means, wherein the input and output means makes time division access to the recording and reproducing means.

Another data editing method according to the present invention is a data editing method through the use of a data recording and reproducing apparatus comprising: recording and reproducing means for recording and reproducing data by using a nonlinear-accessible recording medium; input and output means having at least one input port to which data reproduced by external equipment is inputted and at least one output port for outputting data , the input and output means being capable of making time division access to the recording and reproducing means; and editing means for editing data by using at least either data inputted from the input port or data reproduced by the recording and reproducing means, wherein the external equipment or the recording medium is controlled so as to advance the time to reproduce data from the external equipment or the recording medium, in consideration of a magnitude of delay that occurs until the data reproduced by the external equipment or the recording medium is inputted to the editing means, from the time in a case in which the magnitude of delay is not taken in consideration, when the editing means edits data by using data inputted from the input port and data reproduced by the recording and reproducing means.

Still another data editing method according to the present invention is a data editing method through the use of a data recording and reproducing apparatus comprising: recording and reproducing means for recording and reproducing data by using a nonlinear-accessible recording medium; input and output means having at least one input port to which data reproduced by external equipment is inputted and at least one output port for outputting data, the input and output means being capable of making time division access to the recording and reproducing means; editing means for editing data by using at least either data inputted from the input port or data reproduced by the recording and reproducing means; and routing means for switching input and output routes for data inputted from the input port and data reproduced by the recording and reproducing means in accordance with the effect of editing, wherein editing is performed by selecting in a time-divided manner either data inputted from the input port or data reproduced by the recording and reproducing means.

A further data editing method according to the present invention is a data editing method through the use of a data recording and reproducing apparatus comprising: recording and reproducing means for recording and reproducing data by using a nonlinear-accessible recording medium; input and output means having at least one input port for inputting data and at least one output port for outputting data, the input and output means being capable of making time division access to the recording and reproducing means; editing means for editing data by using at least either data inputted from the input port or data reproduced by the recording and reproducing means; routing means for switching input and output routes for data inputted from the input port and data reproduced by the recording and reproducing mean in accordance with the effect of editing; and special effect processing means for applying special effect processing to input data, wherein the routing means selectively supplies data inputted from the input port and data reproduced by the recording and reproducing means to the special effect processing means.

A further data editing method according to the present invention is a data editing method through the use of a data recording and reproducing apparatus comprising: recording and reproducing means for recording and reproducing data by using a nonlinear-accessible recording medium; input and output means having at least one input port for inputting data and at least one output port for outputting data, the input and output means being capable of making time division access to the recording and reproducing means; editing means for editing data by using at least either data inputted from the input port or data reproduced by the recording and reproducing means; routing means for switching input and output routes for data inputted from the input port and data reproduced by the recording and reproducing means in accordance with the effect of editing; and image display means for displaying an image in accordance with the input data, wherein the routing means selectively supplies data inputted from the input port or data reproduced by the recording and reproducing means to the image display means.

A further data editing method according to the present invention is a data editing method through the use of a data recording and reproducing apparatus comprising: recording and reproducing means for recording and reproducing data by using a nonlinear-accessible recording medium; input and output means having at least one input port for inputting data and at least one output port for outputting data, the input and output means being capable of making access to the recording and reproducing means; and editing means for editing data by using at least either data inputted from the input port or data reproduced by the recording and reproducing means, wherein the recording and reproducing means is controlled so that data to be edited recorded on the recording medium may be reproduced in real time near a switching point at which data to be edited is switched and so that data to be edited may be reproduced in a time shorter than the real time at other sections than the section near the switching point, when the editing means edits data by using first and second data reproduced from the recording medium.

Other and further objects, features and advantages of the invention will appear more fully from the following description.

BRIEF DESCRIPTION OF THE DRAWINGS

FIGS. 23A to 23C are graphical representations for explaining reproducing by the data recording and reproducing apparatus shown in FIG. 17;

DETAILED DESCRIPTION OF THE PREFERRED EMBODIMENTS

An embodiment of the invention will be described in detail below with reference to the accompanying drawings. A data recording and reproducing apparatus according to the embodiment has facilities for recording and reproducing, inputting and outputting, and editing AV (Audio and/or Video) data, and can perform edits by itself.

Figure 2:
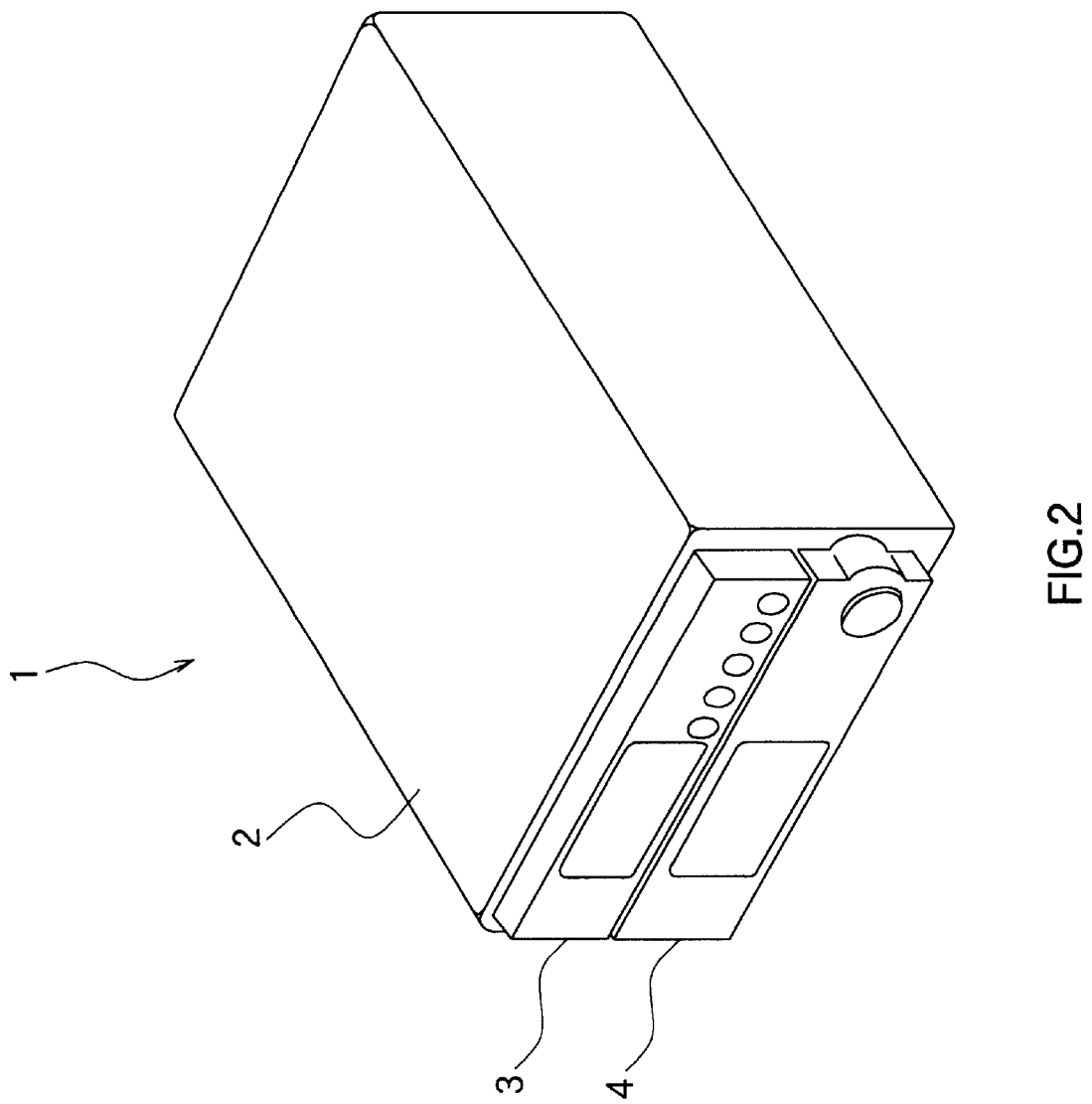
FIG. 2 is a perspective view of an external appearance of the data recording and reproducing apparatus according to one embodiment of the present invention.

FIG. 2 is a perspective view of an external appearance of the data recording and reproducing apparatus according to one embodiment of the invention. A data recording and reproducing apparatus 1 according to the embodiment comprises one housing 2. The housing 2 is approximately the same size as one VCR, for example. A meter panel 3 is provided on an upper area of a front surface of the housing 2. A control panel 4 is provided on a lower front surface of the housing 2. The control panel 4 is removable from the housing 2. The control panel 4 may be removed from the housing 2 so as not to be used. The control panel 4 may also be removed from the housing 2 and connected to a circuit in the housing 2 by a cable so that the control panel 4 may be used in the condition in which the control panel 4 is removed from the housing 2.

Figure 3:
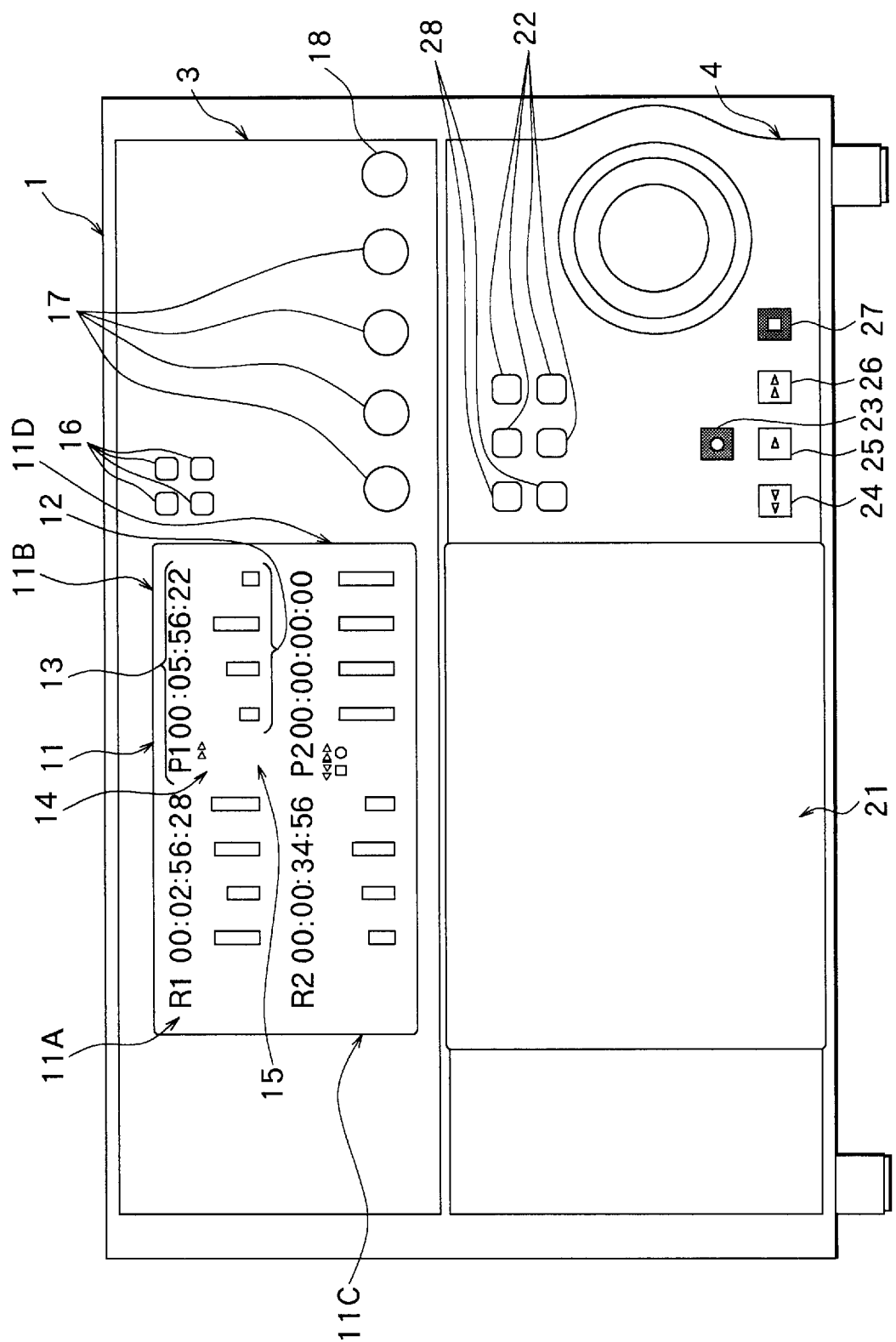
FIG. 3 is a front view of a main part of a meter panel and a control panel shown in FIG. 2.

FIG. 3 is a front view of a main part of the meter panel 3 and the control panel 4 shown in FIG. 2. The data recording and reproducing apparatus 1 according to the embodiment comprises an input processor for inputting AV data or an output processor for outputting AV data. These input and output processors will be referred to as ports in the following description. Each port can input or output video data and four-channel or eight-channel audio data. The meter panel 3 shown in FIG. 3 comprises an indicator 11 for indicating an operating status of four ports. The indicator 11 has four indicator regions 11A to 11D, corresponding to respective ports. The indicator regions 11A, 11B, 11C and 11D are arranged at the upper left, upper right, lower left and lower right of the indicator 11, respectively. Each of the indicator regions 11A to 11D has an audio level meter portion 12 for indicating audio level meters for four channels, a dot matrix portion 13 for indicating a time code or the like, a status indicator 14 for indicating the current operating status (reproducing, recording, etc.) of each port, and an information indicator 15 for indicating various kinds of information such as the type of the Vindicated time code. In the audio level meter portion 12, the number of each channel is indicated under the corresponding audio level meter for the channel. Also, in the audio level meter portion 12, either four audio level meters of first to fourth channels or four audio level meters of fifth to eighth channels are selectively indicated by operating a switch to be described later. Switching of indication is performed in accordance with the operation of a switch not shown.

In the data recording and reproducing apparatus 1 according to the embodiment, each port can perform various operations, such as the selection of input of AV data, the adjustment of a level of recording or reproducing of audio data and the selection of a channel for monitoring audio data. The meter panel 3 has four port select switches 16 for selecting a port to be thus operated.

The meter panel 3 further has four rotary encoders 17 for adjusting the level of recording or reproducing of audio data and a rotary encoder 18 for controlling a video process.

On the other hand, the control panel 4 comprises various switches needed for editing and an operation and display portion 21 including a display for displaying an image or the like for use in editing. The control panel 4 also has four port select switches 22 for selecting a port to be operated, just as the port select switches 16 are provided in the meter panel 3. The control panel 4 further has a switch 23 for giving instructions to record, a switch 24 for giving instructions to fast rewind, a switch 25 for giving instructions to reproduce, a switch 26 for giving instructions to fast forward, and a switch 27 for giving instructions to stop. Also, the data recording and reproducing apparatus 1 according to the embodiment can remotely operate up to two external VCRs. The control panel 4 has two switches 28 for selecting an external VCR to be remotely operated.

Figure 1:
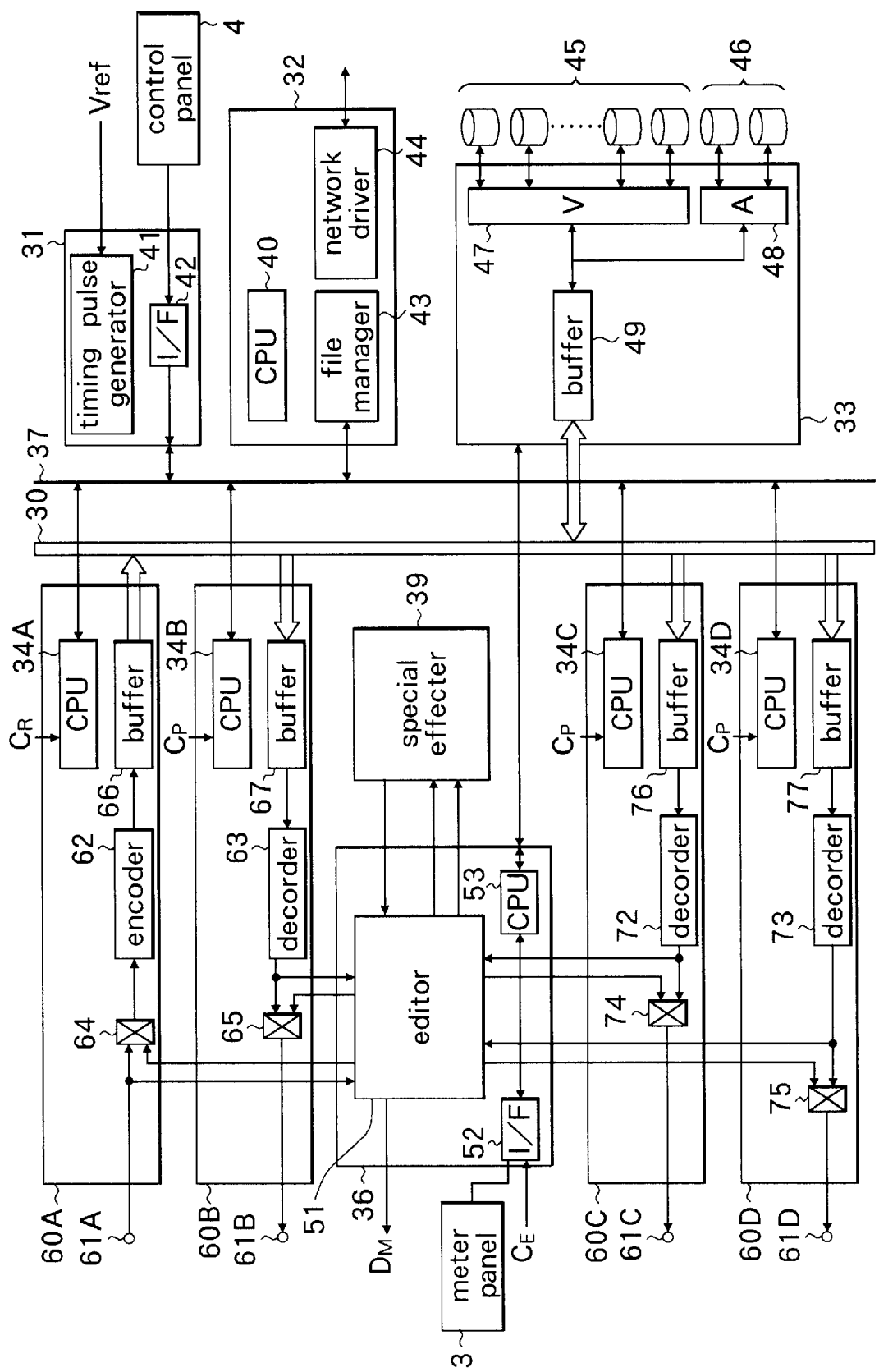
FIG. 1 is a block diagram of a circuit configuration of a data recording and reproducing apparatus according to an embodiment of the present invention.

FIG. 1 is a block diagram of a circuit configuration of the data recording and reproducing apparatus 1 according to the embodiment. The data recording and reproducing apparatus 1 according to the embodiment comprises an internal bus 30 for transferring AV data and commands. A timing manager 31, an information manager 32, a recorder and reproducer 33, ports 60A to 60D and a controller 36 are connected to the internal bus 30. A special effecter 39 is connected to the controller 36. Moreover, the meter panel 3 is connected to the controller 36, and the control panel 4 is connected to the timing manager 31. The components 31 to 39 are provided on separate substrates, for example.

The timing manager 31 has a timing pulse generator 41. The timing pulse generator 41 generates a timing pulse and supplies the timing pulse to each and every circuit needing the timing pulse. That is, the generated timing pulse is supplied to CPUs 34A to 34D of the ports 60A to 60D and a CPU 53 of the controller 36 through a bus 37. A reference video signal $V_{ref}$ from an external apparatus is inputted to the timing pulse generator 41. The timing manager 31 further has an interface 42 (I/F in the drawings) for connecting the control panel 4 with the internal bus 37. The generated timing pulse is used to arbitrate access by the ports 60A to 60D to the internal bus 30. Each port obtains access to the recorder and reproducer 33 within a predetermined period (hereinafter referred to as a time slot period) designated by the timing pulse. Thus, data is transmitted and received between each of the ports 60A to 60D and the recorder and reproducer 33. In short, the internal bus 30 is under so-called time division control.

The information manager 32 has a file manager 43 for holding file management information on a file recording area in a recording medium and managing a file on the basis of the file management information, and a network driver 44 connected to an external network such as Ethernet, for inputting and outputting data in/from the external network. Details of the file management information will be described later.

The recorder and reproducer 33 has a video disk array controller 47 connected to a plurality of hard disk drives 45 (hereinafter referred to as HDDs) for recording video data, for controlling the HDDs 45; an audio disk array controller 48 connected to a plurality of HDDs 46 for recording audio data, for controlling the HDDs 46; and a buffer 49 provided between the disk array controllers 47 and 48 and the internal bus 30, for temporarily storing data. The number of HDDs 45 for video data is nine. Eight HDDs 45 of the nine HDDs 45 are used for recording AV data, and one HDD 45 is used for recording parity data. The nine HDDs 45 and the video disk array controller 47 constitute a system of RAID (Redundant Arrays of Inexpensive Disks)-3. On the other hand, the number of HDDs 46 for audio data is two. The two HDDs 46 and the audio disk array controller 48 constitute a system of RAID-1.

The controller 36 has an editor 51 and an interface 52 (I/F in the drawings) for connecting the meter panel 3 with the internal bus 37. An edit command $C_E$ from an external apparatus can be also inputted to the interface 52. The editor 51 has the functions of a matrix switcher and an audio mixer. The editor 51 is connected to the special effecter 39. The editor 51 has two data output paths for outputting data to the special effecter 39, and one data input path for inputting data from the special effecter 39 to the editor 51. Moreover, the editor 51 can output data DM for monitoring. The special effecter 39 performs processing for obtaining special effects such as dissolves or wipes.

The ports 60A to 60D are connected to terminals 61A to 61D, respectively. It is herein assumed that the terminal 61A is a data input terminal and that the terminals 61B to 61D are data output terminals. AV data to be inputted and outputted by the terminals 61A to 61D is digital data based on serial digital interface (hereinafter referred to as SDI; standardized as SMPTE-259M) standards, for example.

The port 60A has an encoder 62 for extracting AV data from data based on the SDI standards and compressing the AV data as necessary, a switch 64 having two inputs and one output, the CPU 34A and a buffer 66. One input terminal of the switch 64 is connected to the terminal 61A, the other input terminal thereof is connected to the editor 51, and the output terminal thereof is connected to the input terminal of the encoder 62. The terminal 61A is also connected to the editor 51. To compress data, the MPEG2 MP@ML (Moving Picture Experts Group 2 Main Profile at Main Level) system utilizing an inter-frame correlation is used. A buffer 66 is interposed between the output terminal of the encoder 62 and the bus 30. The buffer 66 outputs the stored data in accordance with a control command from the CPU 34A.

The port 60B has a decoder 63 for expanding data if the data is compressed and converting the data into data based on the SDI standards, a switch 65 having two inputs and one output, the CPU 34B and a buffer 67. One input terminal of the switch 65 is connected to the output terminal of the decoder 63, the other input terminal thereof is connected to the editor 51, and the output, terminal thereof is connected to the terminal 61B. The output terminal of the decoder 63 is also connected to the editor 51. The buffer 67 is interposed between the input terminal of the decoder 63 and the bus 30. The buffer 67 outputs the stored data in accordance with a control command from the CPU 34B.

The port 60C has a decoder 72 for expanding data if the data is compressed and converting the data into data based on the SDI standards, a switch 74 having two inputs and one output, the CPU 34C and a buffer 76. One input terminal of the switch 74 is connected to the output terminal of the decoder 72, the other input terminal thereof is connected to the editor 51, and the output terminal thereof is connected to the terminal 61C. The output terminal of the decoder 72 is also connected to the editor 51. The buffer 76 is interposed between the bus 30 and the input terminal of the decoder 72. The buffer 76 stores and outputs the data transferred from the bus 30 in accordance with a control command from the CPU 34C.

The port 60D has a decoder 73 for expanding data if the data is compressed and converting the data into data based on the SDI standards, a switch 75 having two inputs and one output, the CPU 34D and a buffer 77. One input terminal of the switch 75 is connected to the output terminal of the decoder 73, the other input terminal thereof is connected to the editor 51, and the output terminal thereof is connected to the terminal 61D. The output terminal of the decoder 73 is also connected to the editor 51. The buffer 77 is interposed between the bus 30 and the input terminal of the decoder 73. The buffer 77 stores and outputs the data transferred from the bus 30 in accordance with a control command from the CPU 34D. In FIG. 1, the CPUs 34A to 34D are not connected to the components in the respective ports for simplicity. However, each CPU is, in fact, connected to the components so that the control commands from the CPUs 34A to 34D are transmitted to the components.

A recording command $C_R$ from an external apparatus can be further inputted to the CPU 34A. In response to the recording command $C_R$, the CPU 34A controls the processing of transferring and recording data inputted to the terminal 61A to/in the recorder and reproducer 33. A reproducing command $C_P$ from an external apparatus can be further inputted to the CPUs 34B to 34D. In response to the reproducing command $C_P$, the CPUs 34B to 34D control the processing of allowing the recorder and Reproducer 33 to reproduce data and transferring the reproduced data to the terminals 61B to 61D.

Each of the CPUs 34A to 34D of the ports 60A to 60D has a ROM (Read Only Memory) and a RAM (Random Access Memory) although not shown, and the CPU, ROM and RAM constitute a microcomputer. Furthermore, each of the components 31 to 33 and 36 similarly has a CPU, a ROM and a RAM, which constitute a microcomputer.

The ports 60A to 60D can be replaced with other types of data input and output ports. For example, the output ports 60B to 60D can be replaced with the input port 60A. When the output port 60B is replaced with the input port 60A, the data recording and reproducing apparatus 1 is changed to an apparatus having two input ports and two output ports.

The data recording and reproducing apparatus 1 can further include time code detectors (not shown in FIG. 1, see FIG. 9) which are to be described later.

In FIG. 1, the recorder and reproducer 33 and the HDDs 45 and 46 correspond to recording and reproducing means of the invention. The ports 60A to 60D correspond to input and output means of the invention. The controller 36 and the special effecter 39 correspond to editing means of the invention. The meter panel 3 corresponds to indicating means of the invention. The control panel 4 corresponds to an operating portion of the editing means of the invention.

Next, the operation of the data recording and reproducing apparatus 1 according to the embodiment will be described. First, the operation for recording AV data inputted from an external apparatus will be described. In this case, data is inputted to the terminal 61A. This data is then inputted to the encoder 62 via the switch 64 in the port 60A. Encoder 62 extracts AV data from the data based on the SDI standards and the AV data is compressed as necessary. The compressed data is temporarily stored in the buffer 66 in the port 60A. The CPU 34A makes access to the recorder and reproducer 33 within the allocated time slot period and transfers the data stored in the buffer 66 to the recorder and reproducer 33 through the internal bus 30. The time slot is allocated in accordance with the timing pulse from the timing manager 31.

In the recorder and reproducer 33, the transferred data is temporarily stored in the buffer 49 and then the data is read out. Of the data read out from the buffer 49, video data is inputted to the video disk array controller 47 and audio data is inputted to the audio disk array controller 48. The video disk array controller 47 divides the input video data into predetermined units, calculates parity data and records the divided data and the parity data on a plurality of HDDs 45. The audio disk array controller 48 records the input audio data on the two HDDs 46.

Next, the operation for outputting recorded data to an external apparatus will be described. In this case, any one of the CPUs 34B to 34D makes access to the recorder and reproducer 33 within the allocated time slot period and requests the recorder and reproducer 33 to reproduce data. The time slot is allocated in accordance with the timing pulse generated by the timing manager 31. In the recorder and reproducer 33, the video disk array controller 47 reads out the divided video data and the parity data from a plurality of HDDs 45 and combines to unify the divided data, while performing error detection and error correction on the basis of the parity data and reproducing video data. The audio disk array controller 48 reproduces audio data from an error-free HDD 46 of the two HDDs 46. The reproduced video data and audio data are temporarily stored in the buffer 49 and then read out. Then, the video and audio data are transferred to any one of the CPUs 34B to 34D through the internal bus 30.

To output the data from the terminal 61B to an external apparatus, the reproduced data is inputted to the decoder 63 through the buffer 67 in the port 60B. If the reproduced data is compressed, the decoder 63 expands the reproduced data and converts the data into data based on the above-described SDI standards and then the data is outputted from the terminal 61B to an external apparatus through the switch 65. To output the data from the terminal 61C to an external apparatus, the reproduced data is inputted to the decoder 72 through the buffer 76 in the port 60C. If the the reproduced data is compressed, the decoder 72 expands the reproduced data and converts the data into data based on the SDI standards and then the data is outputted from the terminal 61C to an external apparatus through the switch 74. To output the data from the terminal 61D to an external apparatus, the reproduced data is inputted to the decoder 73 through the buffer 77 in the port 60D. If the reproduced data is compressed, the decoder 73 expands the reproduced data and converts the data into data based on the SDI standards and then the data is outputted from the terminal 61D to an external apparatus through the switch 75.

In the data recording and reproducing apparatus 1 according to the embodiment, the CPUs 34A to 34D operate under the time division control. Thus, the same data or different data can be simultaneously outputted from the three terminals 61B to 61D.

Next, the operation for editing data will be described. The editor 51 of the controller 36 edits data by using at least either data inputted from an external apparatus or data reproduced by the recorder and reproducer 33. That is, data inputted from an external apparatus through the terminal 61A and output data reproduced by the recorder and reproducer 33 and expanded by the decoders 63, 72 and 73 can be inputted to the editor 51. The editor 51 performs edits by use of at least one of these data by utilizing the matrix switcher and the audio mixer provided in the editor 51 or by utilizing the special effecter 39 as needed. The editor 51 can perform AB roll editing for obtaining special effects such as dissolves or wipes.

The editor 51 can output data obtained through editing to any one of the switches 64, 65, 74 and 75. The data outputted to the switch 64 is recorded on the HDDs 45 and 46 by the recorder and reproducer 33. The data outputted, to the switches 65, 74 and 75 are outputted from the terminals 61B, 61C and 61D, respectively. Thus, the editor 51 can perform linear editing.

Furthermore, the editor 51 can perform nonlinear editing for holding edit information alone such as data on an edit point, without outputting edited data.

Moreover, the data recording and reproducing apparatus 1 according to the embodiment can perform, by use of the meter panel 3, various operations such as the selection of input of AV data, the adjustment of the level of recording or reproducing of audio data and the selection of a channel for monitoring audio data. Moreover, the indicator 11 of the meter panel 3 can indicate the operating status of the four ports.

Moreover, the data recording and reproducing apparatus 1 according to the embodiment can perform the operations required for editing by use of the control panel 4.

Next, examples of a few systems using the data recording and reproducing apparatus 1 according to the embodiment will be described with reference to FIGS. 4 to 7.

Figure 4:
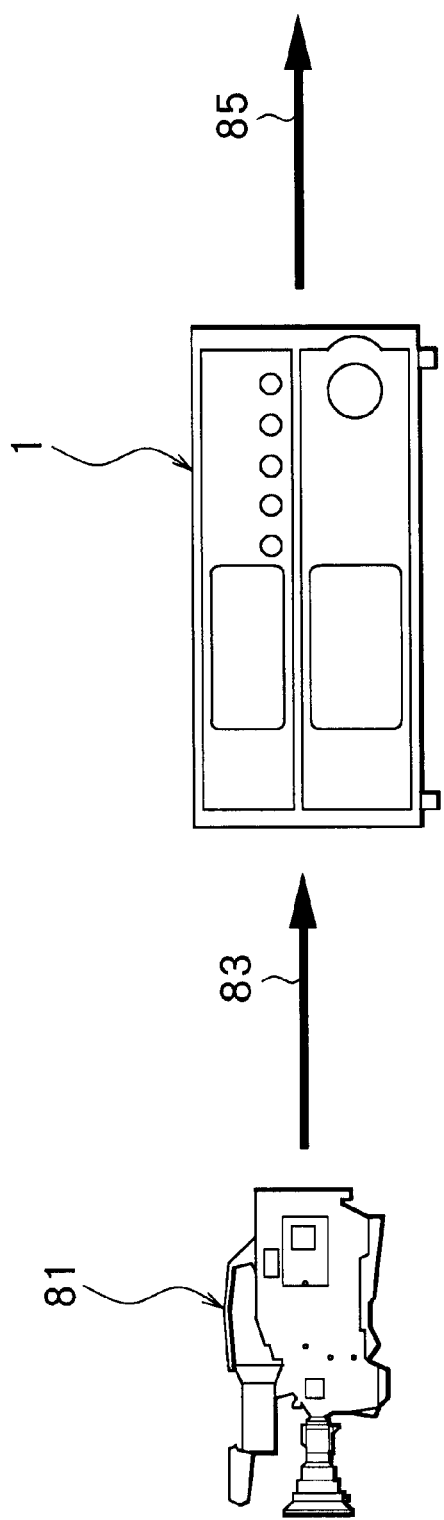
FIG. 4 is a diagrammatic illustration of one example of a system using the data recording and reproducing apparatus according to the embodiment.

A system shown in FIG. 4 is a system for use in a live relay broadcast, for example. In this system, AV data 83 picked up by a video camera 81 is inputted to the data recording and reproducing apparatus 1, and AV data 85 is outputted from the data recording and reproducing apparatus 1. In this system, for instance, while the AV data 83 picked up by the video camera 81 is recorded by the data recording and reproducing apparatus 1, the AV data 85 can be outputted and broadcasted from the data recording and reproducing apparatus 1. Moreover, in this system, the recorded AV data can be simply replayed or replayed in slow motion.

Figure 5:
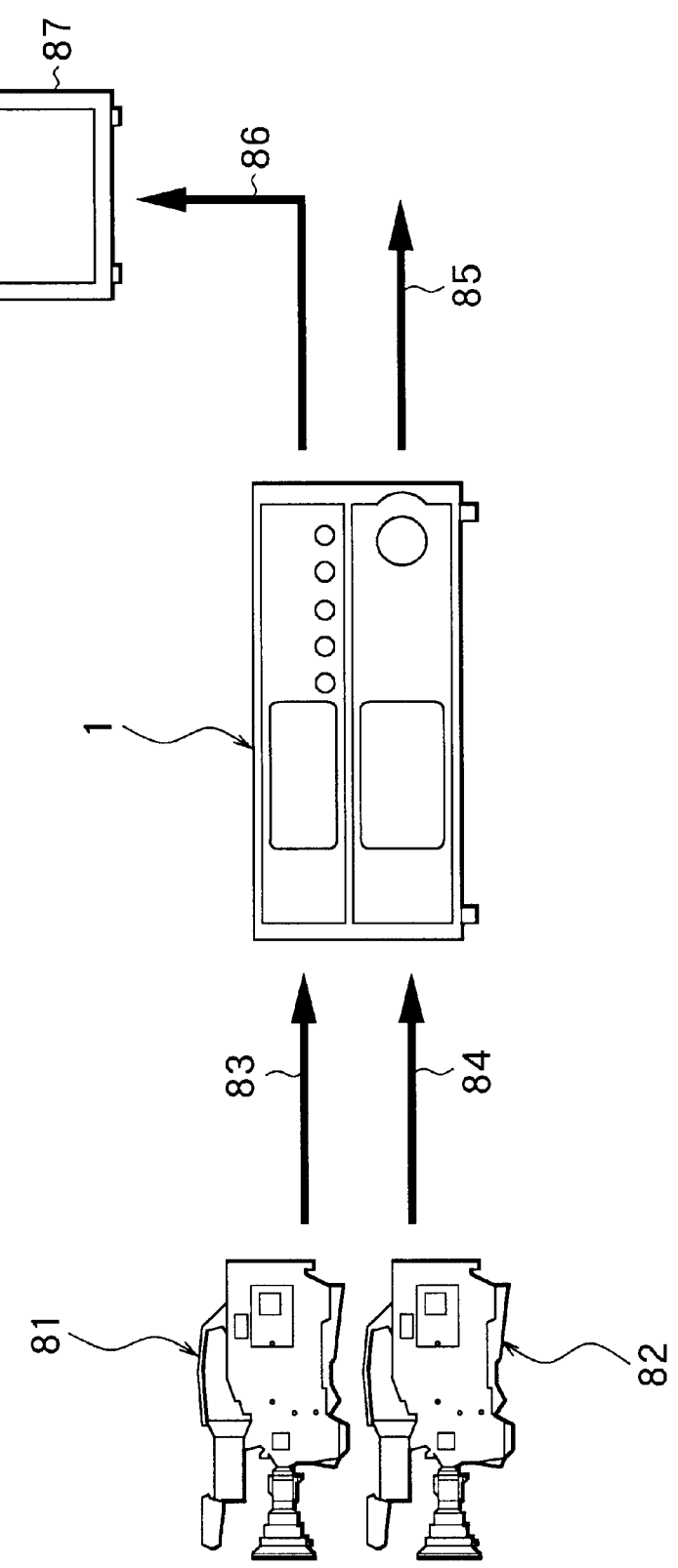
FIG. 5 is a diagrammatic illustration of another example of a system using the data recording and reproducing apparatus according to the embodiment.

A system shown in FIG. 5 is another system for use in a live relay broadcast, for example. In this system, AV data 83 and 84 picked up by two video cameras 81 and 82 are inputted to the data recording and reproducing apparatus 1, and AV data 85 and AV data 86 for monitoring are outputted from the data recording and reproducing apparatus 1. The AV data 86 is inputted to a monitor 87. In this system, for example, while the AV data 83 and 84 picked up by the two video cameras 81 and 82 are switched and recorded by the data recording and reproducing apparatus 1, the AV data 85 can be outputted and broadcasted. Moreover, in this system, the recorded AV data can be simply replayed or replayed in slow motion. Furthermore, in this system, image and sound to be broadcasted can be checked by the monitor 87.

Figure 6:
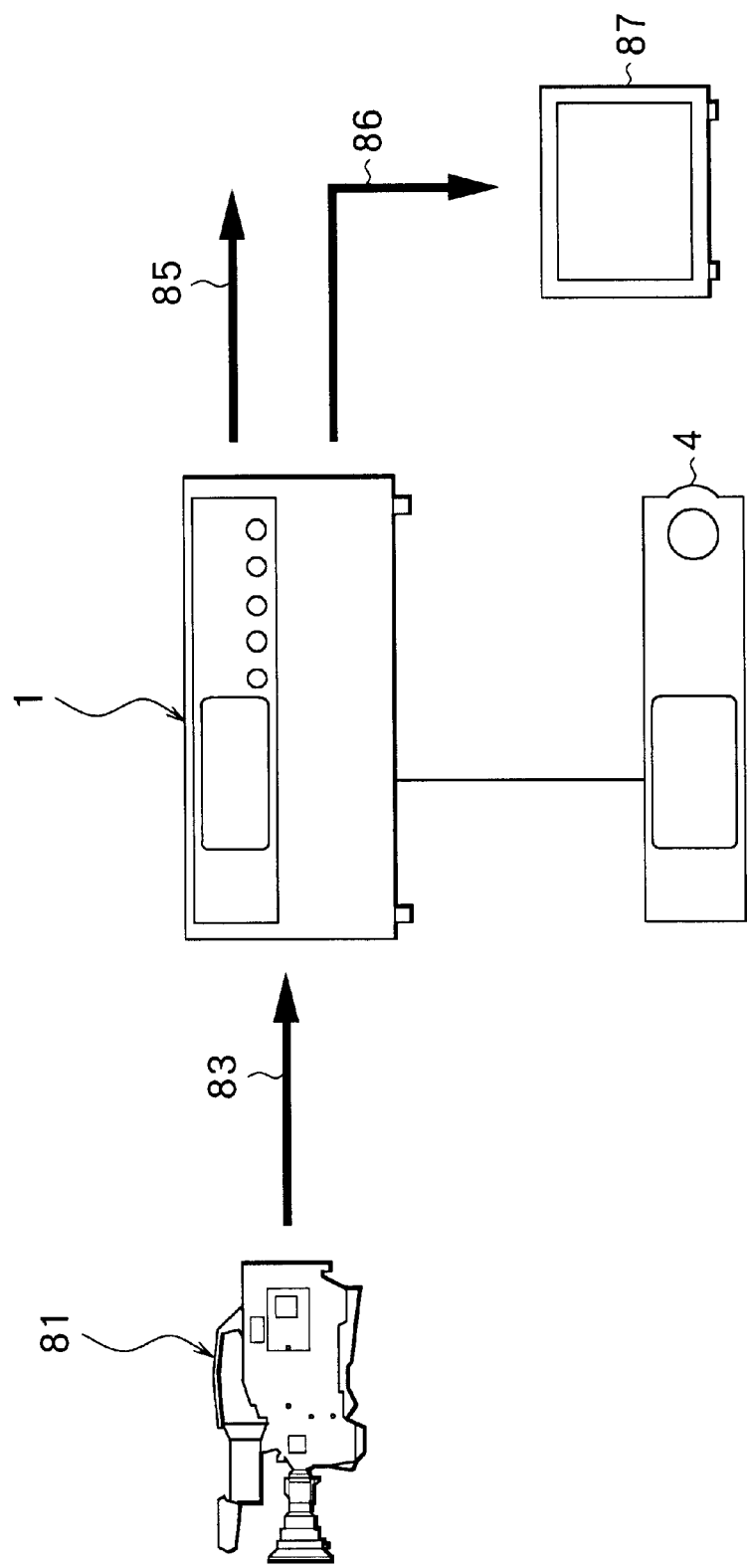
FIG. 6 is a diagrammatic illustration of still another example of a system using the data recording and reproducing apparatus according to the embodiment.

A system shown in FIG. 6 is still another system for use in a live relay broadcast for example. In this system, the AV data 83 picked up by the video camera 81 is inputted to the data recording and reproducing apparatus 1, and the AV data 85 and the AV data 86 for monitoring are outputted from the data recording and reproducing apparatus 1. The AV data 86 is inputted to the monitor 87. In this system, for example, while the AV data 83 picked up by the video camera 81 is recorded by the data recording and reproducing apparatus 1, the AV data 85 can be outputted and broadcasted from the data recording and reproducing apparatus 1. Moreover, in this system, the recorded AV data can be simply replayed or replayed in slow motion. Furthermore, in this system, editing such as highlighting can be performed by using the control panel 4.

Figure 7:
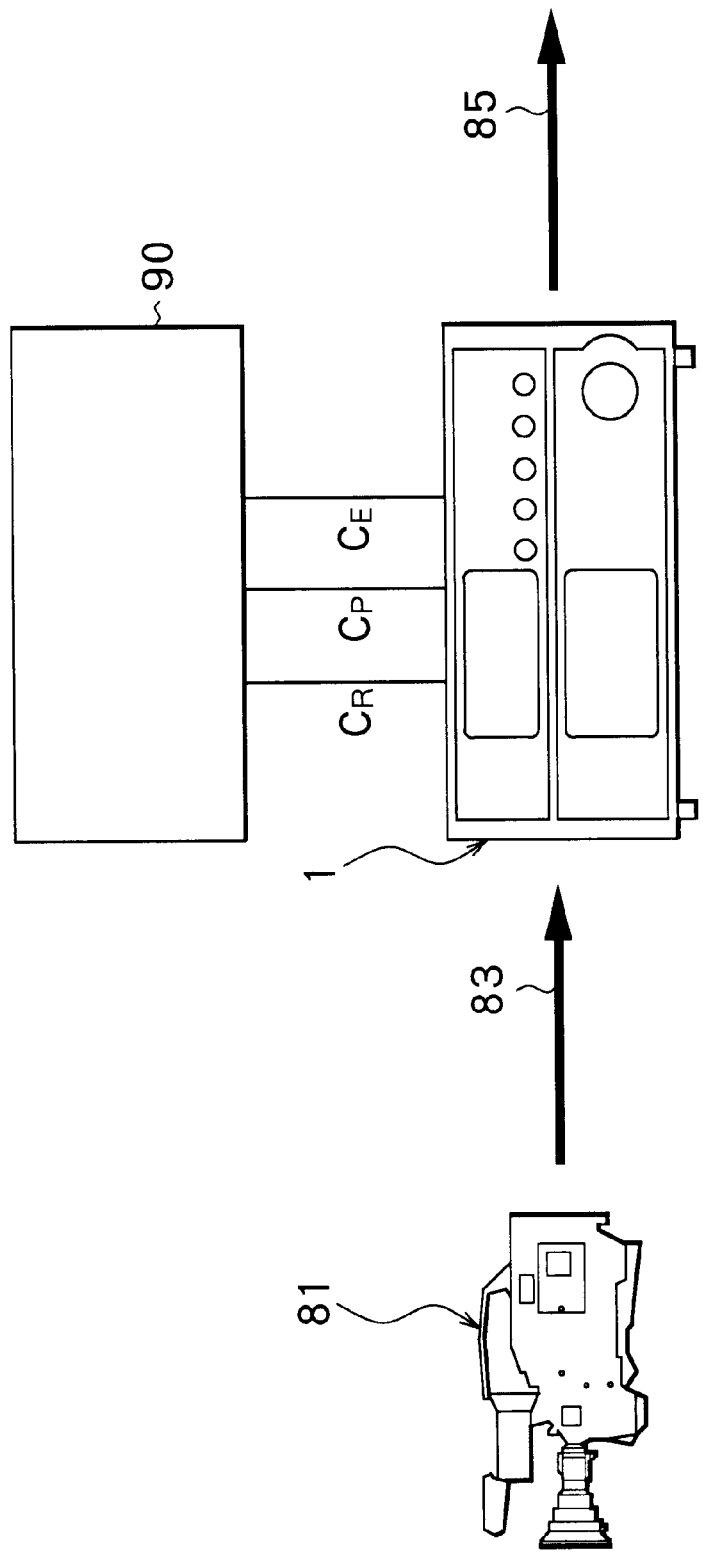
FIG. 7 is a diagrammatic illustration of a further example of a system using the data recording and reproducing apparatus according to the embodiment.

A system shown in FIG. 7 is still another system for use in a live relay broadcast, for example. In this system, the AV data 83 picked up by the video camera 81 is inputted to the data recording and reproducing apparatus 1, and the AV data 85 is outputted from the data recording and reproducing apparatus 1. In this system, an external editing apparatus 90 is connected to the data recording and reproducing apparatus 1. The editing apparatus 90 gives the recording command $C_R$, the reproducing command $C_P$ and the edit command $C_E$ to the data recording and reproducing apparatus 1. In this system, for example, while the AV data 83 picked up by the video camera 81 is recorded by the data recording and reproducing apparatus 1, the AV data 85 can be outputted and broadcasted from the data recording and reproducing apparatus 1. Moreover, in this system, the recorded AV data can be simply replayed or replayed in slow motion. Furthermore, in this system, the external editing apparatus 90 is operated, whereby editing can be performed in the data recording and reproducing apparatus 1.

As described above, in the data recording and reproducing apparatus 1 according to the embodiment, the facilities for recording and reproducing, inputting and outputting, and editing data are contained and integrated in one housing 2. In other words, the data recording and reproducing apparatus 1 has the functions of a server and an editing apparatus. Therefore, according to the data recording and reproducing apparatus 1 according to the embodiment, one apparatus can perform edits by itself. In the data recording and reproducing apparatus 1 according to the embodiment, the HDDs 45 and 46 having the RAID configuration are used as means for storing data, and the ports 60A to 60D can make time division access to the recorder and reproducer 33. Thus, the recorder and reproducer 33 and the HDDs 45 and 46 can have the functions equivalent to two to four VCRs.

Therefore, according to the data recording and reproducing apparatus 1 according to the embodiment, a system needed for editing in a relay car or in the open can be established in a small occupied space. Moreover, editing work becomes simple because work incidental to editing such as frequent replacement of video tapes becomes no longer necessary.

Moreover, the data recording and reproducing apparatus 1 according to the embodiment is provided with the meter panel 3. Thus, it is possible to easily check the operating status of the apparatus such as the operating status of each of the ports 60A to 60D.

Moreover, according to the data recording and reproducing apparatus 1 according to the embodiment, the editor 51 can perform edits independently 6f inputting and outputting of AV data. Thus, AV data can be simultaneously and concurrently recorded, edited and broadcasted.

Moreover, according to the data recording and reproducing apparatus 1 according to the embodiment, the CPUs 34A to 34D make time division access to the recorder and reproducer 33. Thus, each of the ports 60A to 60D can make access to the recorder and reproducer 33 apparently simultaneously. Consequently, data can be simultaneously inputted to and outputted from each of the ports 60A to 60D.

Figure 8:
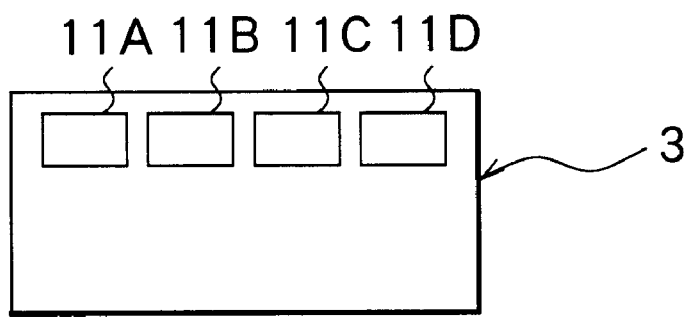
FIG. 8 is a diagrammatic illustration of an example of an arrangement of indicator regions.

The present invention is not limited to the above-described embodiment and various changes are possible. For example, as shown in FIG. 8, the indicator regions 11A to 11D provided on the meter panel 3, each indicator region corresponding to each port, may be placed in a line in a horizontal direction.

Moreover, in the present invention, the integration of the recording and reproducing means, the input and output means and the editing means is not always limited to the case in which all the means are contained in one housing. The integration also includes the case in which the means are contained in a plurality of housings mechanically coupled to one another.

The overall configuration and the operation of the data recording and reproducing apparatus 1 have been described above. Various forms of editing using the editor 51 and the special effecter 39 will be specifically described below.

Figure 9:
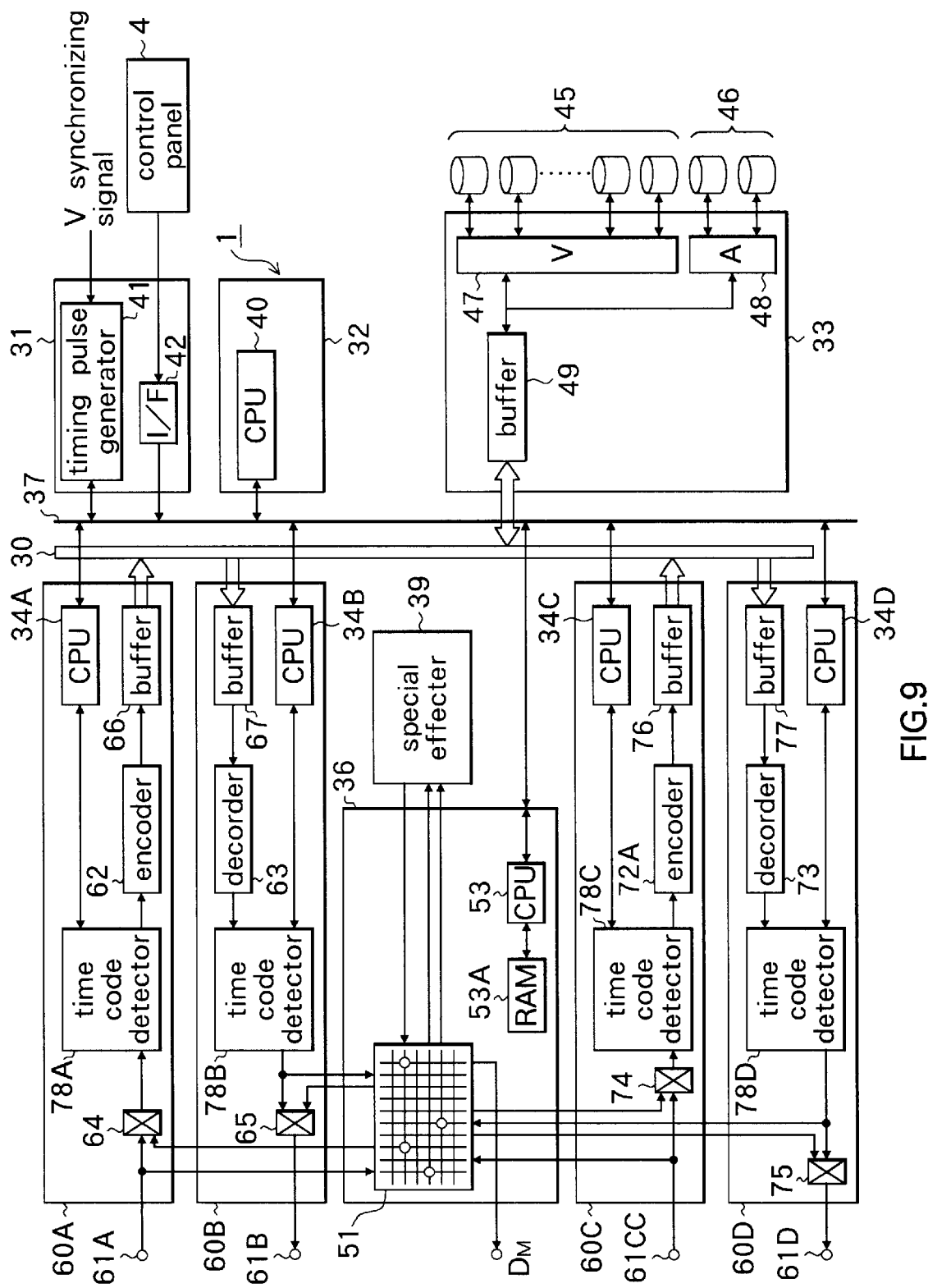
FIG. 9 is a block diagram showing a modified configuration of the data recording and reproducing apparatus shown in FIG. 1.

FIG. 9 shows a modified configuration of the data recording and reproducing apparatus 1 shown in FIG. 1. The data recording and reproducing apparatus 1 shown in FIG. 9 differs from the data recording and reproducing apparatus 1 shown in FIG. 1 in that the output port 60C is replaced with the input port 60A so as to provide a configuration having two inputs and two outputs. Also, time code detectors 78A to 78D of the respective ports are clearly shown in FIG. 9, as distinct from FIG. 1. The same components as the components of FIG. 1 are indicated by the same reference numerals. Since the configuration and the operation of the components 31 to 33, the ports 60A to 60D and the controller 36 are substantially the same as those of the components of FIG. 1, the description thereof is omitted.

The time code detector 78A of the input port 60A is interposed between a switch 64 and the encoder 62. The time code detector 78A is time code detecting means for detecting the time code of or accompanying the signal selected by the switch 64 and transferring the time code to the CPU 34A. The CPU 34A transmits to the time code detector 78A a control signal for instructing the time code detector 78A to detect the time code, whereby the time code is detected. Then, the detected time code is transferred to a CPU 53 of the controller 36 through the control bus 37.

The time code detector 78B of the output port 60B is interposed between the decoder 63 and a switch 65. The time code detector 78B is time code detecting means for detecting the time code of the data decoded by the decoder 63 and transferring the time code to the CPU 34B. The CPU 34B transmits to the time code detector 78B a control signal for instructing the time code detector 78B to detect the time code, whereby the time code is detected. Then, the detected time code is transferred to the CPU 53 of the controller 36 thorough a control bus 37.

The time code detector 78C of the input port 60C is interposed between a switch 74 and an encoder 72A. The time code detector 78C detects the time code included in the data selected by the switch 74. The time code is detected in accordance with the control signal from the CPU 34C. Then, the detected time code is transferred to the CPU 53 of the controller 36 through the CPU 34C and the control bus 37.

The time code detector 78D of the output port 60D is interposed between the decoder 73 and a switch 75. The time code detector 78D detects the time code of the data decoded by the decoder 73. The time code is detected under control of the CPU 34D. Then, the detected time code is transferred to the CPU 53 through the CPU 34D and the control bus 37.

As described above, the controller 36 comprises the editor 51, the CPU 53 and a RAM 53A. The data inputted from the input ports 60A and 60C and the output ports 60B and 60D are edited through the editor 51. Furthermore, the data are outputted to the special effecter 39 and then subjected to special effects such as wipes. Then, the data which has been edited or subjected to special effect processing is again outputted to the switches 64, 65, 74 and 75 of the input and output ports 60A to 60D.

Now, a flow of a series of signals for special effect processing at the time of nondestructive editing using the data recording and reproducing apparatus 1 will be briefly described. Nondestructive editing refers to editing using the data recorded on the HDDs 45 and 46. This kind of editing is referred to as nondestructive editing because data once recorded remain undestroyed and recorded on the HDDs 45 and 46. Nondestructive editing may be generically called nonlinear editing. On the other hand, editing using VCRs or the like is called linear editing and referred to as destructive editing. First, the brief description of nondestructive editing will be given below.

In the data recording and reproducing apparatus 1, two separate data are inputted by the CPU 53 from the HDDs 45 and 46 to the buffers 67 and 77 of the output ports 60B and 60D through a data bus 37 under time division control. In the data recording and reproducing apparatus 1, the two data inputted to the output ports 60B and 60D are timed in the buffers 67 and 77 under control of the CPU 53 over the CPUs 34B and 34D of the output ports 60B and 60D. Then, the data are inputted to the following decoders 63 and 73, whereby SDI data, SDTI data or the like is obtained. Then, in the data recording and reproducing apparatus 1, two decoded data are inputted to the controller 36 through the time code detectors 78B and 78D. In the data recording and reproducing apparatus 1, a switching point of the editor 51 is set by the CPU 53, whereby a connect route of the data is determined. In the data recording and reproducing apparatus 1, the two data are switched (cut in or cut out) or the two data are inputted to the special effecter 39 in accordance with this route. The two data inputted to the special effecter 39 are subjected to desired special effect processing such as dissolves or wipes, and then the data are again inputted to the editor 51. The edited data are inputted to the switch 64 or 74 of the input port 60A or 60C in accordance with the connect route set by the editor 51, while the data are outputted to the monitor. The data inputted to the input port 60A or 60C are recorded on the HDDs 45 and 46 through the data bus 30.

Thus, in the data recording and reproducing apparatus 1, the two data recorded on the HDDs 45 and 46 can be edited at the time of the nondestructive editing. The edited data can be checked by outputting these data to the monitor, and the data can be newly recorded on the HDDs 45 and 46.

Next, a series of operations for editing at the time of destructive editing using the data recording and reproducing apparatus 1 will be briefly described. Herein, the description is presented on the assumption that a VCR as external equipment is connected to the data recording and reproducing apparatus 1 and that a signal from the VCR is connected to a signal read from the HDDs 45 and 46.

In the data recording and reproducing apparatus 1, as shown in FIG. 9, the data read from the HDDs 45 and 46 by the CPU 53 is outputted to the output port 60D through the data bus 30. The data inputted to the output port 60D is inputted to the decoder 73 through the buffer 77 and then the data is expanded, whereby the SDI data is obtained. Then, the time code of the decoded data is detected by the time code detector 78D under control of the CPU 53 over the CPU 34D. The CPU 53 issues the control signal indicating a reproducing start command to a VCR (not shown) connected to the input terminal of the input port 60A in accordance with this time code. The VCR reproduces a video signal in accordance with this control signal, and the video signal is inputted to the input port 60A. Then, the time code of the video signal inputted from the VCR to the input port 60A is detected by the time code detector 78A under control of the CPU 53 over the CPU 34A. The time codes of the data from the HDDs 45 and 46 and the data from the VCR are checked. Then, these two data are timed by the CPU 53, and then inputted to the controller 36. The switching point of the editor 51 is set by the CPU 53, shown in the figure only in simplified form, whereby the connect route of the data is determined. The two data are switched (cut in or cut out) or the two data are inputted to the special effecter 39 in accordance with the connect route. The two data inputted to the special effecter 39 are subjected to special effect processing such as wipes or dissolves, and then the data are again inputted to the editor 51. The edited data are inputted to the switch 64 of the input port 60A in accordance with the connect route set by the editor 51, while the data are outputted to the monitor. The data inputted to the input port 60A are recorded on the HDDs 45 and 46 through the data bus 30.

Thus, in the data recording and reproducing apparatus 1, data recorded on the HDDs 45 and 46 and data from an external VCR can be edited at the time of destructive editing. The edited data can be checked by outputting these data to the monitor, and the data can be newly recorded on the HDDs 45 and 46.

As described above, editing in the editor 51 referrs to such an editing processing performed on two input data A and B that firstly the data A is edited within a certain period, then the data B is edited and then the data A is again edited after a predetermined time period (picture-in-picture), for example. If the switching point is subjected to special effects such as wipes or dissolves, the data is inputted to and processed in the special effecter 39.

A series of processes for editing at the time of destructive editing in the data recording and reproducing apparatus 1, which has been briefly described above, will be again described in detail with reference to FIGS. 10 to 16. Herein, the description is presented on the assumption that a VCR as an external equipment is connected to the input terminal of the input port 60A.

Figure 10:
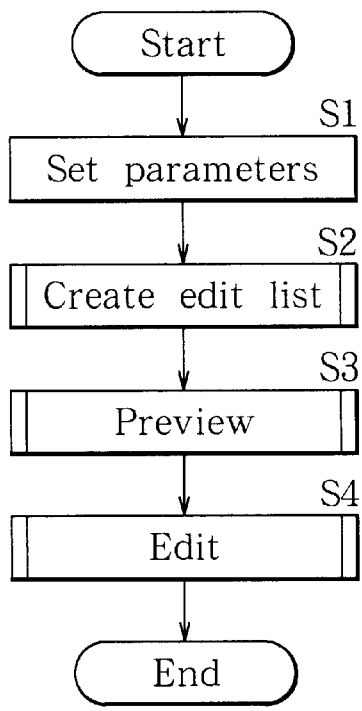
FIG. 10 is a flow chart of a procedure for destructive editing in the data recording and reproducing apparatus shown in FIG. 9.

As shown in FIG. 10, first, in step S1, the data recording and reproducing apparatus 1 sets various parameters such as a memory size at the time of initialization. In this step S1, the data recording and reproducing apparatus 1 also obtains the parameters such as the time for preroll or postroll of the connected VCR.

Then, in step S2, the data recording and reproducing apparatus 1 creates an edit, list indicating the contents to be edited. That is, the data recording and reproducing apparatus 1 issues the reproducing command to the connected VCR and previews data, thereby obtaining the edit point such as so-called IN point and OUT point. Information on this edit point includes the time code of the signal, for example.

Figure 11:
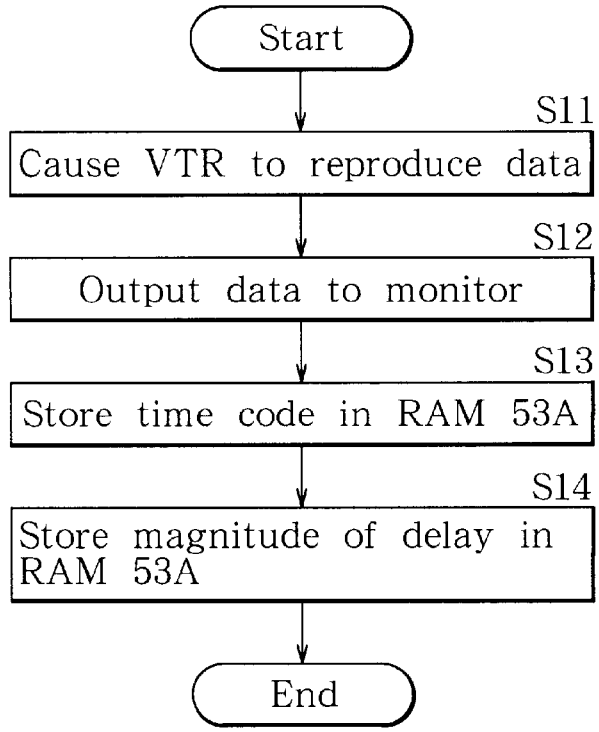
FIG. 11 is a flow chart of processes of creating edit list for VCR in destructive editing shown in FIG. 10.

This edit point is obtained through a series of steps shown in FIG. 11. As shown in FIG. 11, in step S11, the data recording and reproducing apparatus 1 issues the reproducing command to the VCR by using the CPU 53, thereby causing the VCR to reproduce data. The data reproduced by the VCR is inputted to the input port 60A, and the data is inputted to the editor 51 of the controller 36. Then, in step S12, the data recording and reproducing apparatus 1 switches the switching point of the editor 51 and thereby sets the connect route, and the data recording and reproducing apparatus 1 outputs the signal from the VCR to the monitor. In this step, the data recording and reproducing apparatus 1 controls the CPU 34A of the input port 60A by using the CPU 53 and outputs from the time code detector 78A the time code of the signal outputted to the monitor. In the data recording and reproducing apparatus 1, a user operates the control panel 4, thereby searching for a desired edit point. When the edit point is found, in step 813, the information on the edit point, i.e., the time code is stored in the RAM 53A. Moreover, in step S14, the data recording and reproducing apparatus 1 stores in the RAM 53A the magnitude of delay, i.e., the time period between the time when the reproducing command is issued to the VCR by the CPU 53 and the time when the reproduced signal is inputted to the editor 51. In this manner, the data recording and reproducing apparatus 1 obtains the edit point of the signal from the VCR.

Moreover, the data recording and reproducing apparatus 1 previews a desired file (data) recorded on the HDDs 45 and 46, thereby obtaining the edit point.

Figure 12:
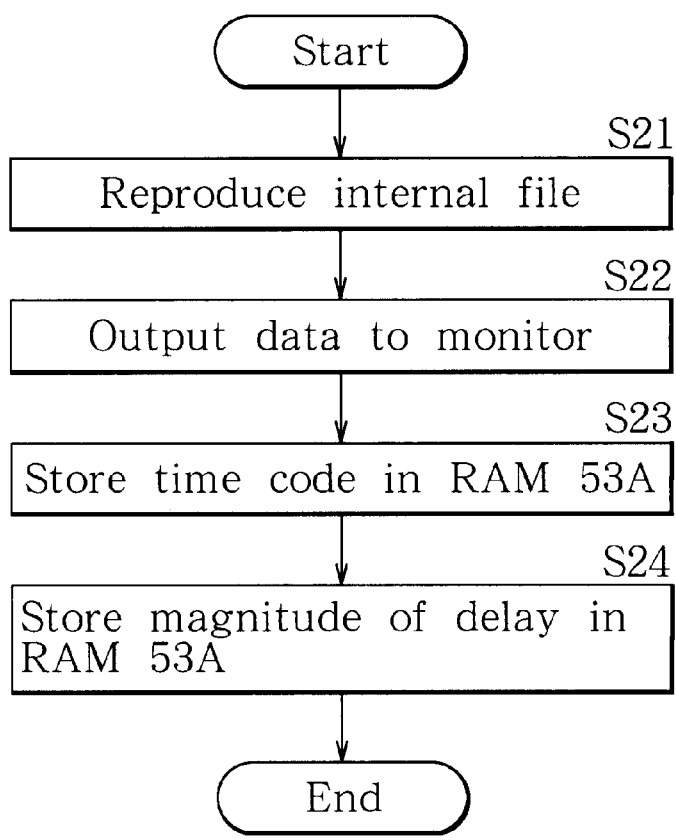
FIG. 12 is a flow chart of processes of creating edit list for internal file in destructive editing shown in FIG. 10.

This edit point is obtained through a series of steps shown in FIG. 12. As shown in FIG. 12, first, in step S21, the data recording and reproducing apparatus 1 issues the reproducing command to the file recorded on the HDDs 45 and 46 by using the CPU 53, thereby reproducing the desired file. The reproduced data is inputted to the output port 60D, and the data is inputted to the editor 51 of the controller 36. Then, in step S22, the data recording and reproducing apparatus 1 switches the switching point of the editor 51, thereby setting the connect route and outputting this data to the monitor. In this step, the data recording and reproducing apparatus 1 controls the CPU 34D of the output port 60D by using the CPU 53, and the time code detector 78D always monitors the time code of the signal outputted to the monitor. In the data recording and reproducing apparatus 1, the user operates the control panel 4, thereby searching for the desired edit point. When the edit point is found, in step S23, the information on the edit point, i.e., the time code is stored in the RAM 53A. Moreover, in step S24, the data recording and reproducing apparatus 1 stores in the RAM 53A the magnitude of delay occurring at the time of reproducing an internal file. That is, in the data recording and reproducing apparatus 1, the delay occurs for the time period in which the CPU 53 issues the reproducing command to the internal file recorded on the HDDs 45 and 46, then the reproducing command is inputted to a processor (not shown) of the HDDs 45 and 46 via the control bus 37, then the reproducing command is issued to the HDDs 45 and 46 by the processor so that the file is reproduced, then the data is inputted to the output port 60D through the data bus 30 and then the data reaches the editor 51. The data recording and reproducing apparatus 1 stores the magnitude of delay in the RAM 53A. In this manner, the data recording and reproducing apparatus 1 obtains the edit point of the internal file recorded on the HDDs 45 and 46.

Furthermore, the data recording and reproducing apparatus 1 determines the editing form such as picture-in-picture at the time of creating the edit list in step S2 shown in FIG. 10.

Next, in the data recording and reproducing apparatus 1, the preview in step S3 shown in FIG. 10 is performed as necessary. This preview is executed through a series of steps shown in FIG. 13. The description herein is given with regard to the case in which the desired internal file recorded on the HDDs 45 and 46 is combined with the data reproduced by the VCR and the combination is subjected to special effect processing.

Figure 13:
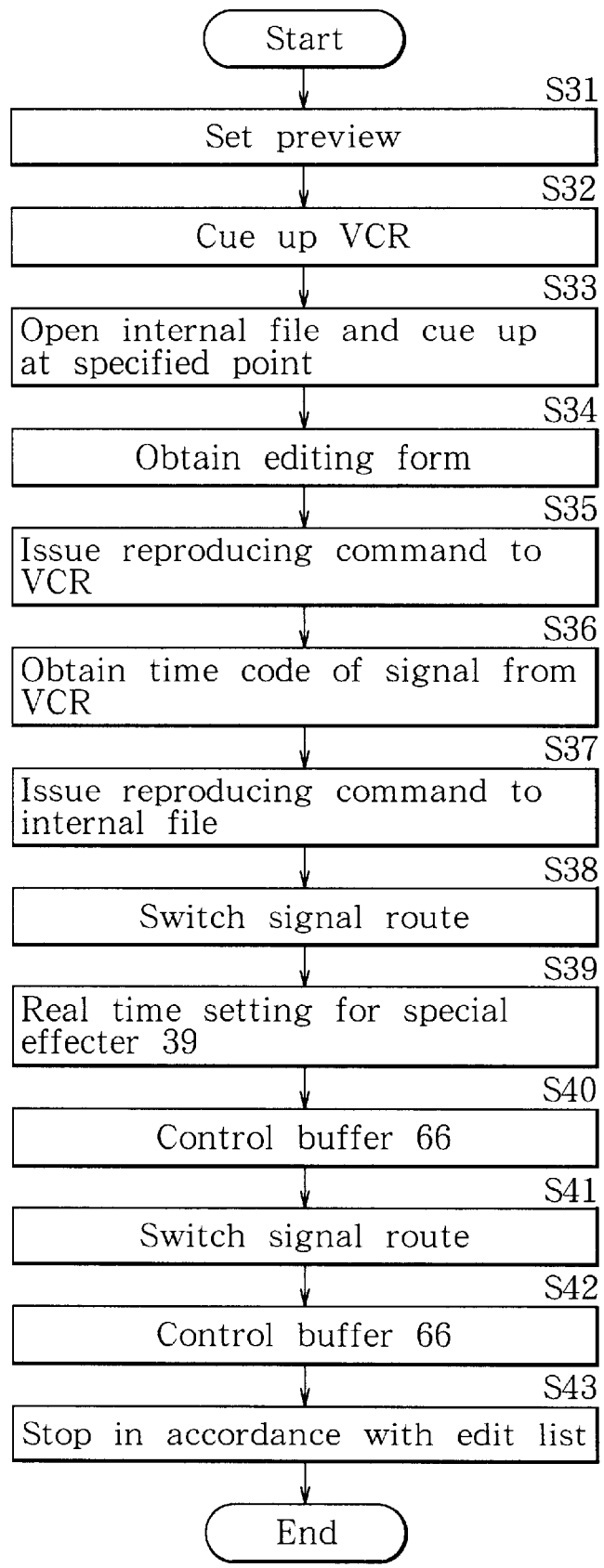
FIG. 13 is a flow chart of processes of preview in destructive editing shown in FIG. 10.

In the data recording and reproducing apparatus 1, the edit list created in step 82 is executed by the CPU 53. As shown in FIG. 13, in step S31, first of all, the preview for setting up a monitor output system is set. Then, in step S32, the data recording and reproducing apparatus 1 makes the VCR cue up before the edit point. Then, in step S33, the internal file recorded on the HDDs 45 and 46 is reproduced and made to cue up at the specified point. Then, in step S34, the data recording and reproducing apparatus 1 obtains the information about the parameters of the VCR and the connect route, the magnitude of delay stored in the RAM 53A or the like in accordance with the edit list. Then, in step S35, the data recording and reproducing apparatus 1 issues the reproducing command to the VCR, thereby causing the VCR to reproduce data. In the data recording and reproducing apparatus 1, in step S36, the time code of the signal reproduced by the VCR and inputted to the input port 60A is always detected and obtained by the time code detector 78A under the control of the CPU 53 over the CPU 34A.

Next, the data recording and reproducing apparatus 1 determines the timing of issue of the reproducing command for reproducing the desired internal file recorded on the HDDs 45 and 46, in accordance with the time code obtained from the signal from the VCR and the edit list. In step S37, the reproducing command is issued at this timing.

The timing of issue of the reproducing command for reproducing the desired internal file recorded on the HDDs 45 and 46 will be now described.

In the data recording and reproducing apparatus 1, if the reproducing command is issued at the timing based on the time code on the edit list of the data reproduced by the VCR, as described above, the delay occurs for the time period in which the reproducing command is inputted to the processor (not shown) of the HDDs 45 and 46 via the control bus 37, then the reproducing command is issued to the HDDs 45 and 46 by the processor so that the desired internal file is reproduced, then the reproduced data is inputted to the output port 60D through the data bus 30 and then the data reaches the editor 51. In the data recording and reproducing apparatus 1, it is therefore necessary to wait for the input of the signal from the VCR to the, editor 51 in order to eliminate this time loss. Therefore, in the data recording and reproducing apparatus 1, the reproducing command is not issued when the time code of the edit point stored in the RAM 53A in step S13 at the time of creating the edit list matches the time code of the data reproduced by the VCR in step S36. The timing of issue of the reproducing command is advanced by the time equivalent to the magnitude of delay occurring at the time of reproducing the internal file stored in the RAM 53A in step S24 from the HDDs 45 and 46. Thus, in the data recording and reproducing apparatus 1, the timing of input of the signal from the VCR to the editor 51 can match the timing of input of the internal file to the editor 51.

In the data recording and reproducing apparatus 1, then, in step S38, the switching point of the editor 51 is switched and set by the CPU 53, whereby the connect route is determined. In the data recording and reproducing apparatus 1, in step S39, real time setting for the special effecter 39 is performed. Then, in step S40, the buffer 66 is controlled, whereby a system delay is adjusted. In the data recording and reproducing apparatus 1, the delay is increased if data passes through the special effecter 39. Thus, if a signal route is suddenly changed so that the data may pass through the special effecter 39, a gap occurs between the signal and a pre-reproduced signal. Therefore, in the data recording and reproducing apparatus 1, data are previously stored in the buffer 66 so that the data may be continuous on the buffer 66. In the data recording and reproducing apparatus 1, the pre-reproduced signal may be allowed to pass through the special effecter 39 so that the system delay may not be changed in special effect processing.

In this manner, in the data recording and reproducing apparatus 1, the signal is inputted to the special effecter 39 and the signal is subjected to special effect processing. After the timing of the end of the special effect processing, in step S41, the switching point of the editor 51 is set by the CPU 53, whereby the signal route is switched. Then, in the data recording and reproducing apparatus 1, in step S42, the buffer 66 is controlled in order to restore the system delay adjusted in step S40 to the original status. Then, in the data recording and reproducing apparatus 1, in step S43, the reproducing of the signal is stopped in accordance with the edit list and a series of preview processes is ended. In this case, the reproducing of the signal is automatically stopped if the internal file is short.

As described above, in the data recording and reproducing apparatus 1, the preview is performed for combining the desired internal file recorded on the HDDs 45 and 46 with the data reproduced by the VCR and applying special effect processing to the combination.

Figure 14:
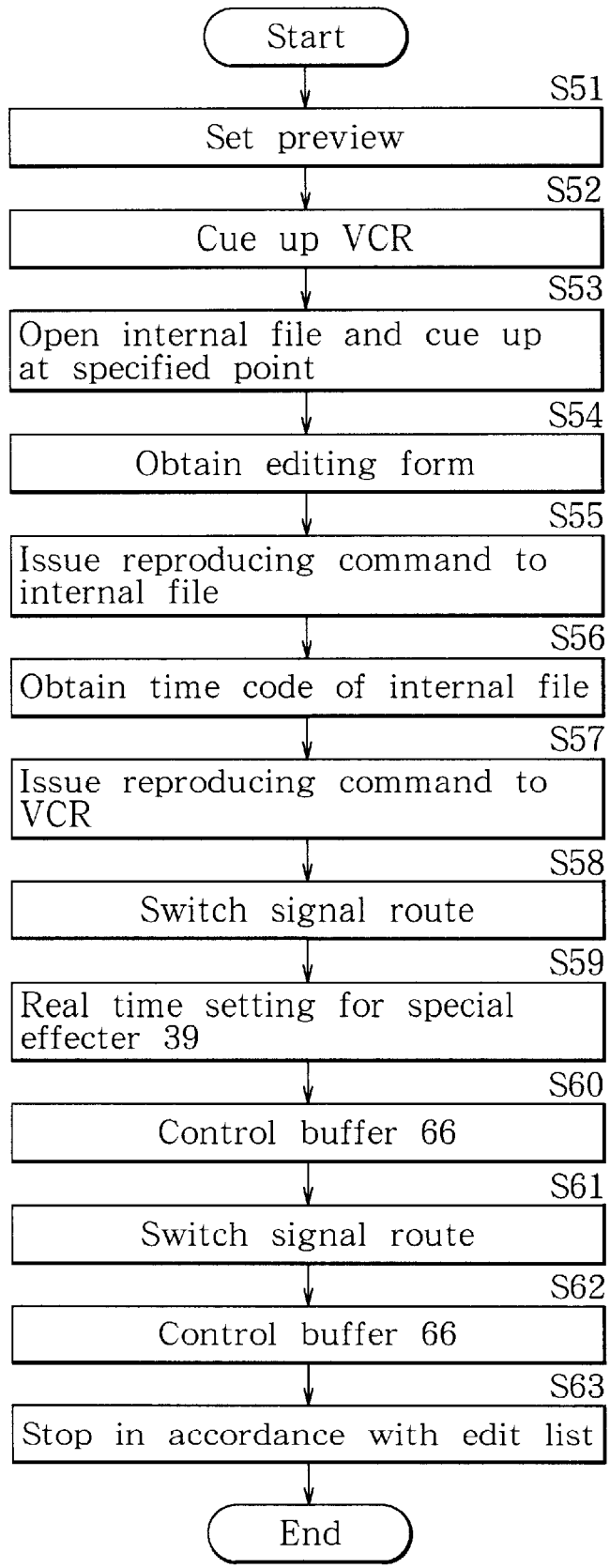
FIG. 14 is another flow chart of processes of preview in destructive editing shown in FIG.10.

On the other hand, the preview is executed through a series of steps shown in FIG. 14 in order to combine the data reproduced by the VCR with the desired internal file recorded on the HDDs 45 and 46 and to apply special effect processing to the combination.

In the data recording and reproducing apparatus 1, the edit list created in step S2 is executed by the CPU 53. Then, as shown in FIG. 14, first, in step S51, the preview for setting up the monitor output system is set as described above. Then, in step S52, the data recording and reproducing apparatus 1 makes the VCR cue up before the edit point. After that, in step S53, the internal file recorded on the HDDs 45 and 46 is read out and made to cue up at the specified point. The order of cue up may be as follows: first, the internal file recorded on the HDDs 45 and 46 is read out and made to cue up at the specified point, and then the VCR is made to cue up before the edit point. In next step S54, the data recording and reproducing apparatus 1 obtains the information about the editing form such as the parameters of the VCR, the signal route and the magnitude of delay stored in the RAM 53A in accordance with the edit list. Then, in step S55, the data recording and reproducing apparatus 1 issues the reproducing command to the internal file recorded on the HDDs 45 and 46, thereby reproducing the desired internal file. Furthermore, in the data recording and reproducing apparatus 1, in step S56, the time code of the data on the file in the output port 60D is always detected and obtained by the time code detector 78D under the control of the CPU 53 over the CPU 34D.

Then, the data recording and reproducing apparatus 1 determines the timing of issue of the reproducing command for causing the VCR to reproduce data, in accordance with the time code obtained from the internal file and the edit list. In step S57, the reproducing command is issued to the VCR at this timing.

The timing of issue of the reproducing command for causing the VCR to reproduce data will be described below.

In the data recording and reproducing apparatus 1, as described above, the delay occurs for the time period in which the data is inputted from the VCR to the editor 51 through the input port 60A. It is needless to say that the magnitude of delay includes the time required to transmit the reproducing command issued by the data recording and reproducing apparatus 1 through the internal bus and the time required to transmit the signal reproduced by the VCR to the editor 51 through the internal bus. The magnitude of delay also includes the time that elapses before the VCR starts reproducing after the VCR receives the reproducing command. This time that elapses before the VCR starts reproducing depends on inertia of the VCR or the like, for example, and therefore varies depending on the type of the VCR. For this reason, the magnitude of delay, as distinct from the fixed magnitude of delay occurring at the time of reproducing the file from the HDDs 45 and 46, is variable. Also in this case, in the data recording and reproducing apparatus 1, it is necessary to wait for the input of the file from the HDDs 45 and 46 to the editor 51 in order to eliminate the time loss. Therefore, in the data recording and reproducing apparatus 1, the reproducing command is not issued when the time code of the edit point stored in the RAM 53A in step S23 at the time of creating the edit list matches the time code of the internal file in step S56. The timing of issue of the reproducing command is advanced by the time equivalent to the magnitude of delay occurring at the time of reproducing the VCR signal stored in the RAM 53A in step S14. Thus, in the data recording and reproducing apparatus 1, the timing of input of the internal file to the editor 51 can match the timing of input of the signal from the VCR to the editor 51.

In the data recording and reproducing apparatus 1, in next step S58, the switching point of the editor 51 is switched and set by the CPU 53, whereby the connect route is determined. In the data recording and reproducing apparatus 1, in step S59, the real time setting for the special effecter 39 is performed. Then, in step S60, the buffer 66 is controlled, whereby the system delay is adjusted as described above.

In this way, in the data recording and reproducing apparatus 1, the signal is inputted to the special effecter 39 and the signal is subjected to special effect processing. After the timing of the end of the special effect processing, in step S61, the switching point of the editor 51 is set by the CPU 53, whereby the signal route is switched. Then, in the data recording and reproducing apparatus 1, in step S62, the buffer 66 is controlled in order to restore the system delay adjusted in step S60 to the original status. Then, in the data recording and reproducing apparatus 1, in step S63, the reproducing of the signal is stopped in accordance with the edit list and a series of preview processes is ended. Also in this case, the reproducing of the signal is automatically stopped if the internal file is short.

As described above, in the data recording and reproducing apparatus 1, the desired internal file recorded on the HDDs 45 and 46 and the signal reproduced by the VCR are reproduced, and the reproduced video and/or audio data is previewed.

Figure 15:
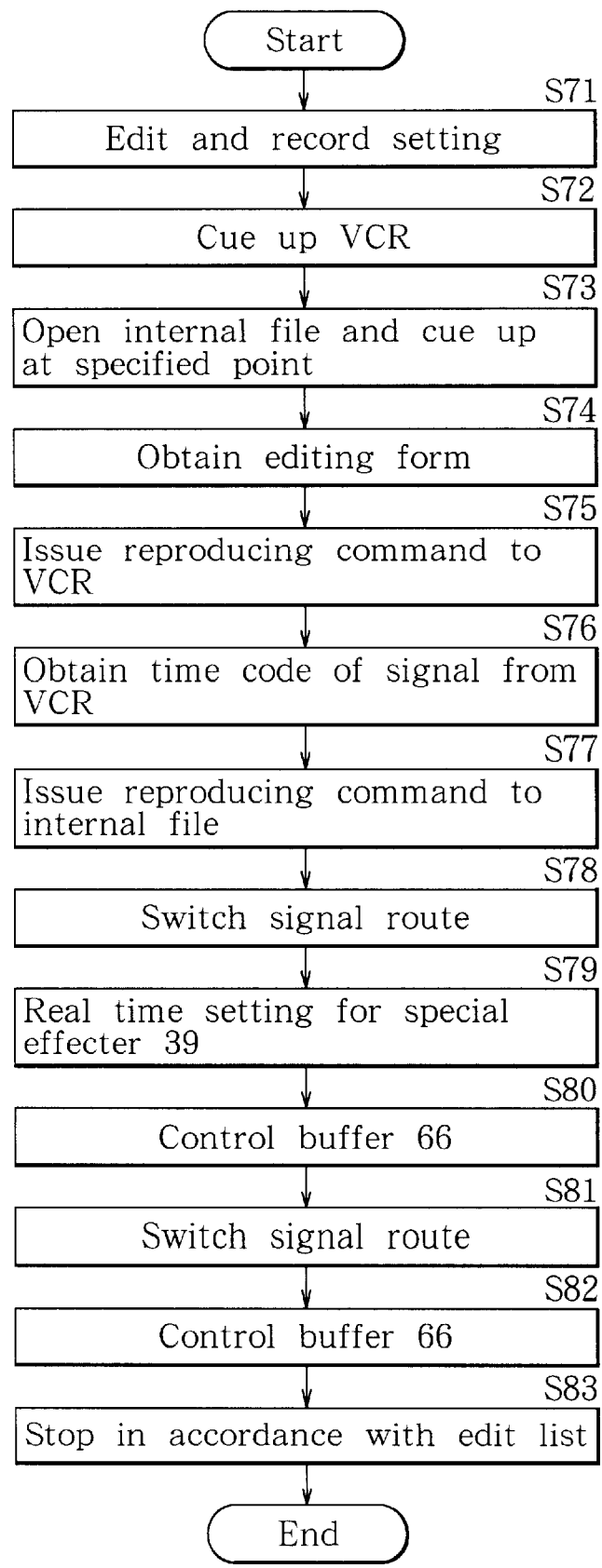
FIG. 15 is a flow chart of processes of editing in destructive editing shown in FIG. 10.
Figure 16:
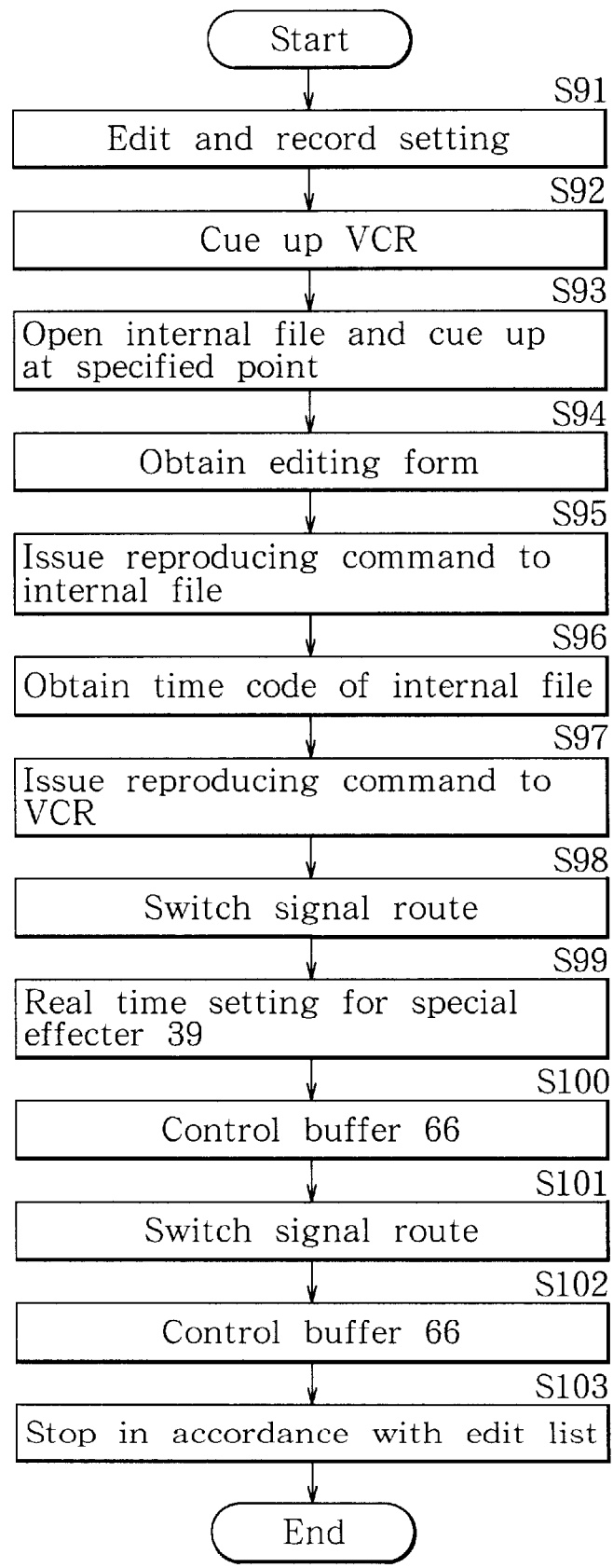
FIG. 16 is another flow chart of processes of editing in destructive editing shown in FIG. 10.

After the data recording and reproducing apparatus 1 performs the above previewing, as shown in FIG. 10, in step S4, editing shown in FIG. 15 or 16 is performed in accordance with the edit list created by operating the control panel 4. Firstly, the description is given with regard to the case in which the desired internal file recorded on the HDDs 45 and 46 is combined with the data reproduced by the VCR and the combination is subjected to special effect processing.

In the data recording and reproducing apparatus 1, the edit list created in step S2 is executed by the CPU 53. As shown in FIG. 15, in step S71, edit and record setting for setting the apparatus to recording mode is performed. Then, in step S72, the data recording and reproducing apparatus 1 makes the VCR cue up before the edit point. Then, in step S73, the internal file recorded on the HDDs 45 and 46 is reproduced and made to cue up at the specified point. Then, in step S74, the data recording and reproducing apparatus 1 obtains the information about the editing form such as the parameters of the VCR, the signal route and the magnitude of delay stored in the RAM 53A. Then, in step S75, the data recording and reproducing apparatus 1 issues the reproducing command to the VCR, thereby causing the VCR to reproduce data. Then, in the data recording and reproducing apparatus 1, in step S76, the time code of the signal reproduced by the VCR and inputted to the input port 60A is always detected and obtained by the time code detector 78A under the control of the CPU 53 over the CPU 34A.

Then, the data recording and reproducing apparatus 1 determines the timing of issue of the reproducing command in consideration of the above-described magnitude of delay in accordance with the time code obtained from the signal from the VCR and the edit list. In step S77, the reproducing command is issued at this timing. Then, in the data recording and reproducing apparatus 1, in step S78, the switching point of the editor 51 is switched land set by the CPU 53, whereby the data connect route is determined. In the data recording and reproducing apparatus 1, in step S79, the real time setting for the special effecter 39 is performed. Then, in step 880, the buffer 66 is controlled, whereby the system delay is adjusted.

The data is inputted to the special effecter 39 and the data is subjected to special effect processing. After the timing of the end of the special effect processing, in step S81, the switching point of the editor 51 is set by the CPU 53, whereby the connect route is switched. Then, in the data recording land reproducing apparatus 1, in step S82, the buffer 66 is controlled in order to restore the system delay adjusted in step S80 to the original status. Then, in the data recording and reproducing apparatus 1, in step S83, the reproducing of the signal is stopped in accordance with the edit list and a series of editing processes is ended. Also in this case, the reproducing of the signal is automatically stopped if the internal file is short.

As described above, the data recording and reproducing apparatus 1 can combine the desired internal file recorded on the HDDs 45 and 46 with the data reproduced by the VCR and can apply special effect processing to the combination.

On the other hand, editing is performed through a series of steps shown in FIG. 16 in order to combine the data reproduced by the VCR with the desired internal file recorded on the HDDs 45 and 46 and to apply special effect processing to the combination.

In the data recording and reproducing apparatus 1, the edit list created in step S2 is executed by the CPU 53. As shown in FIG. 16, in step S91, the edit and record setting for setting the input port 60A to recording mode is performed. Then, in step S92, the data recording and reproducing apparatus 1 makes the VCR cue up before the edit point. Then, in step S93, the internal file, recorded on the HDDs 45 and 46 is opened and made to cue up at the specified point. The order of cue up may be, of course, as follows: first, the internal file recorded on the HDDs 45 and 46 is opened and made to cue up at the specified point, and then the VCR is made to cue up before the edit point. In next step S94, the data recording and reproducing apparatus 1 obtains the information about the editing form such as the parameters of the VCR, the signal route and the magnitude of delay stored in the RAM 53A in accordance with the edit list. Then, in step S95, the data recording and reproducing apparatus 1 issues the reproducing command to the HDDs 45 and 46 in order to reproduce the file, thereby reproducing the desired internal file. Furthermore, in the data recording and reproducing apparatus 1, in step S96, the time code of the signal, which is obtained by reproducing the internal file and inputted to the output port 60D, is always detected and obtained by the time code detector 78D under the control of the CPU 53 over the CPU 34D.

Then, the data recording and reproducing apparatus 1 determines the timing of issue of the reproducing command in consideration of the above-mentioned magnitude of delay in accordance with the time code obtained from the internal file and the edit list. In step S97, the reproducing command is issued to the VCR at this timing. Then, in the data recording and reproducing apparatus 1, in next step S98, the switching point of the editor 51 is switched and set by the CPU 53, whereby the data connect route is determined. In the data recording and reproducing apparatus 1, in step S99, the real time setting for the special effecter 39 is performed. Then, in step S100, the buffer 66 is controlled, whereby the system delay is adjusted as described above.

In this manner, in the data recording and reproducing apparatus 1, the data inputted to the special effecter 39 is subjected to special effect processing. After the timing of the end of the special effect processing, in step S101, the switching point of the editor 51 is set by the CPU 53, whereby the connect route is switched. Then, in the data recording and reproducing apparatus 1, in step S102, the buffer 66 is controlled in order to restore the system delay adjusted in step S100 to the original status. Then, in the data recording and reproducing apparatus 1, in step S103, the reproducing of the signal is stopped in accordance with the edit list and a series of editing processes is ended. Also in this case, the reproducing of the signal is automatically stopped if the internal file is short.

As described above, the data recording and reproducing apparatus 1 combines the data reproduced by the VCR with the desired file recorded on the HDDs 45 and 46 and applies special effect processing to the combination.

In the data recording and reproducing apparatus 1, special effect processing at the time of linear destructive editing is performed through a series of steps described above.

As described above, the data recording and reproducing apparatus 1 contains the special effecter 39, whereby special effect processing at the time of nonlinear nondestructive editing can be performed. Furthermore, the data recording and reproducing apparatus 1 contains the editor 51 and controls the components by using the CPU 53, whereby the routes for the input signal from the external equipment and the signal outputted from the HDDs 45 and 46 can be controlled and thus these two signals can be subjected to linear destructive editing for special effect processing. The data recording and reproducing apparatus 1 has the editor 51, the special effecter 39 and so on, whereby various edits by the simple connection to an external equipment and the control of the external equipment can be performed. Consequently, a system cost can be reduced and the convenience of the operation is improved.

The present invention is not limited to the above-described embodiment. For example, the VCR may be connected to either of the input ports 60A and 60C, and the signal from the HDDs 45 and 46 may be outputted to either of the output ports 60B and 60D. Moreover, in the above description of the present invention, the time code detector of each port is interposed between the selector and the encoder or between the decoder and the selector. However, the time code detector may be interposed between the input terminal or the output terminal of each port and the selector. Furthermore, although the present invention has been described above as the apparatus having four input and output channels, i.e., two input channels and two output channels, any number of the input and output channels may be provided. Thus, it is needless to say that the present invention can be appropriately changed within the scope not departing from the spirit of the invention.

Next, the constitution of the editor 51 of the controller 36 will be described with reference to FIG. 17.

Figure 17:
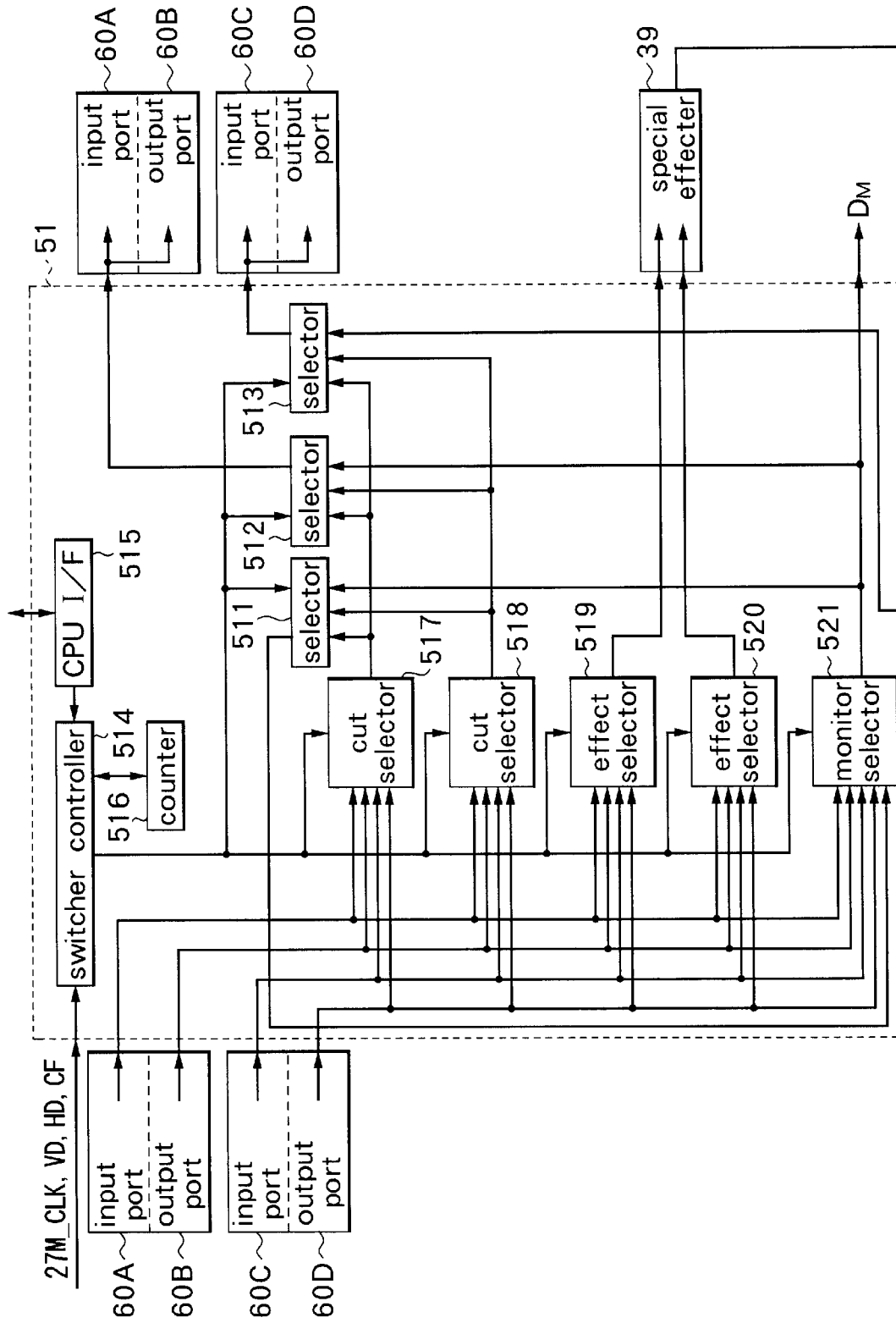
FIG. 17 is a block diagram showing a detailed configuration of an editor in the data recording and reproducing apparatus shown in FIG. 9.

The editor 51 shown in FIG. 17 comprises cut selectors 517 and 518 for cutting by switching, effect selectors 519 and 520 for selecting and supplying data to the special effecter 39, and a monitor selector 521 for selecting and supplying data to the monitor.

The editor 51 further comprises selectors 511, 512 and 513 for selecting and Supplying data which is cut or subjected to special effect processing, to the input port 60A, the output ports 60B, 60C and 60D and the monitor selector 521; and a switcher controller 514, a CPU I/F 515 and a counter 516 which constitute switching means for switching a selection status of the cut selectors 517 and 518, the effect selectors 519 and 520, the monitor selector 521 and the selectors 511, 512 and 513 in accordance with a V synchronizing signal.

A two-channel routing and cutting section comprises the cut selectors 517 and 518.

Each of the cut selectors 517 and 518 is a circuit for cutting by switching at least two input channels. The output data from the input port 60A and the output ports 60B, 60C and 60D are inputted to each of the cut selectors 517 and 518. For example, the data from the input port 60A is data based on the above-mentioned SDI standards, and the data from the output ports 60B, 60C and 60D are the SDI data decoded by the decoders 63, 72 and 73. For the cut selectors 517 and 518, the switching of the input data is controlled under switching control of the switcher controller 514.

Specifically, each of the cut selectors 517 and 518 selects data in synchronization with the V synchronizing signal, thereby cutting two inputs.

The cut selectors 517 and 518 can also perform routing, fading of audio data, and mixing.

The data subjected to the cutting or the like by the cut selectors 517 and 518 are inputted to the selectors 511, 512 and 513.

Each of the effect selectors 519 and 520 selects the input to the special effecter 39. The output data from the input port 60A and the output ports 60B, 60C and 60D are inputted to each of the effect selectors 519 and 520, similarly to the cut selectors 517 and 518. For the effect selectors 519 and 520, the switching of the input data is controlled in accordance with a switching control signal from the switcher controller 514.

The effect selectors 519 and 520 select any data among the input data and output the selected data to the special effecter 39. In the special effecter 39, image data inputted to the controller 36 is subjected to special effect processing such as wipes or dissolves by using two inputs from the effect selectors 519 and 520. Then, the image data subjected to special effect processing is again inputted to the editor 51. Special effect processing refers to processing which is performed between two different images: specifically, processing in which one image is replaced with another image in motion such as the turn of a page of a book or the motion of a car's windshield wiper or processing in which the next image fades in while the previous image fades out.

The monitor selector 521 selects data to be outputted to the monitor (not shown). The output data from the input port 60A and the output ports 60B, 60C and 60D are inputted to the monitor selector 521, and the data selected by the selector 511 is further inputted to the monitor selector 521. For the monitor selector 521, the switching of the input data is controlled in accordance with the switching control signal from the switcher controller 514.

The image data selected by the monitor selector 521 is outputted to the monitor.

The selectors 511, 512 and 513 select any data among the data edited by the cut selectors 517 and 518 and the special effecter 39 and output the selected data to the monitor and the input port 60A and the output ports 60B, 60C and 60D.

That is, the selectors 511, 512 and 513 select any one output among three outputs, i.e., the outputs from the cut selectors 517 and 518 and the output from the special effecter 39 and then output the selected output to the following ports and the monitor. For the selection of the output by the selectors 511, 512 and 513, the switching is controlled in accordance with the switching control signal from the switcher controller 514.

Specifically, the selector 512 outputs one selected data to the input port 60A and the output port 60B. The selector 513 outputs one selected data to the output ports 60C and 60D. The selector 511 outputs one selected data to the monitor selector 521.

Thus, the data selected by the selector 512 is recorded on the HDDs 45 and 46 through the input port 60A, or the data is outputted to an external apparatus through the output port 60B in the form of the SDI data, for example.

The data selected by the selector 513 is outputted to the external apparatus through the output ports 60C and 60D in the form of the SDI data.

By combination of the selector 511 and the monitor selector 521, the selector 511 selects any one data among seven data, i.e., the outputs from the ports 60A to 60D, the two outputs from the cut selectors 517 and 518 and the output from the special effecter 39 and then outputs the selected data to the monitor.

Figure 18:
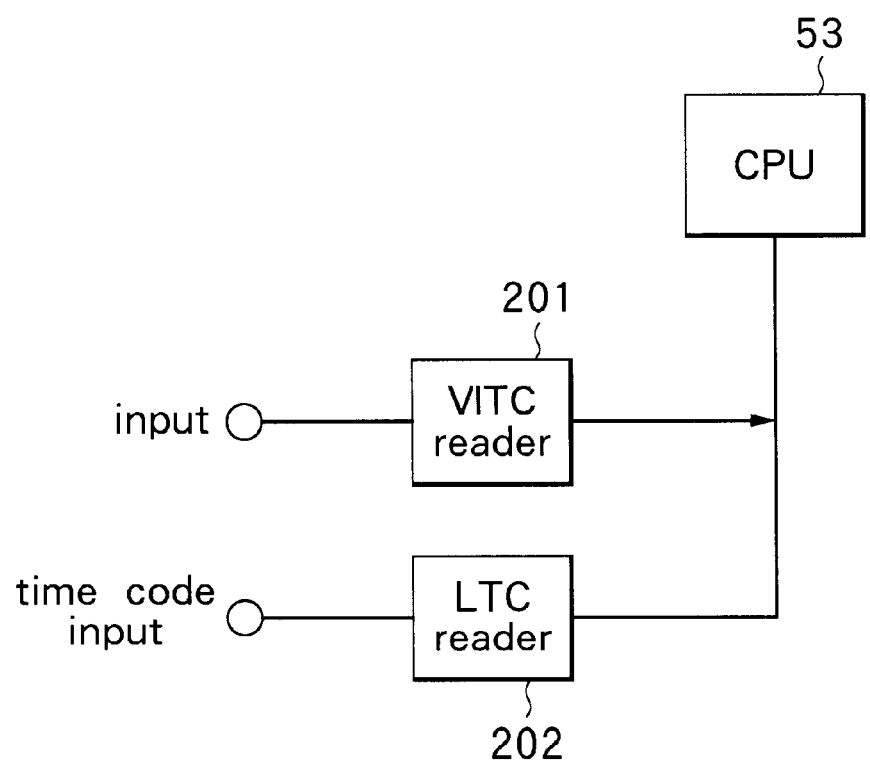
FIG. 18 is a block diagram for explaining the operation of a controller shown in FIG. 9.

Next, the switcher controller 514 for controlling the switching of the selectors and the processing in the counter 516 will be described with reference to FIGS. 18 to 20.

The switcher controller 514 controls the selectors in accordance with the time c)de obtained by the CPU 53 of the controller 36. The signal or the like from the CPU 53 is transmitted and received through the CPU I/F 515 that is the interface with the CPU 53. The counter 516 counts the V synchronizing signal.

The CPU 53 obtains the time code in the following manner. As shown in FIG. 17, a switcher controller 514 reads the time code from the data inputted to the cut selectors 517 and 518, the effect selectors 519 and 520 and the monitor selector 521. Also, as described above, the time codes detected by the time code detectors 78A to 78D of the ports 60A to 60D are inputted to the CPU 53 through the bus 37, and the time codes are read. As shown in FIG. 18, the switcher controller 514 has the function of a VITC reader 201 therein. The switcher controller 514 also has an LTC reader 202 preceding the CPU 53. That is, the time code is read by the LTC reader 202 before the time code, which has been outputted to the CPU 53 through the CPU I/F 515 and inputted to the CPU 53 through the bus, is inputted to the CPU 53. The time code read by the LTC reader 202 is inputted to the CPU 53.

Figure 19:
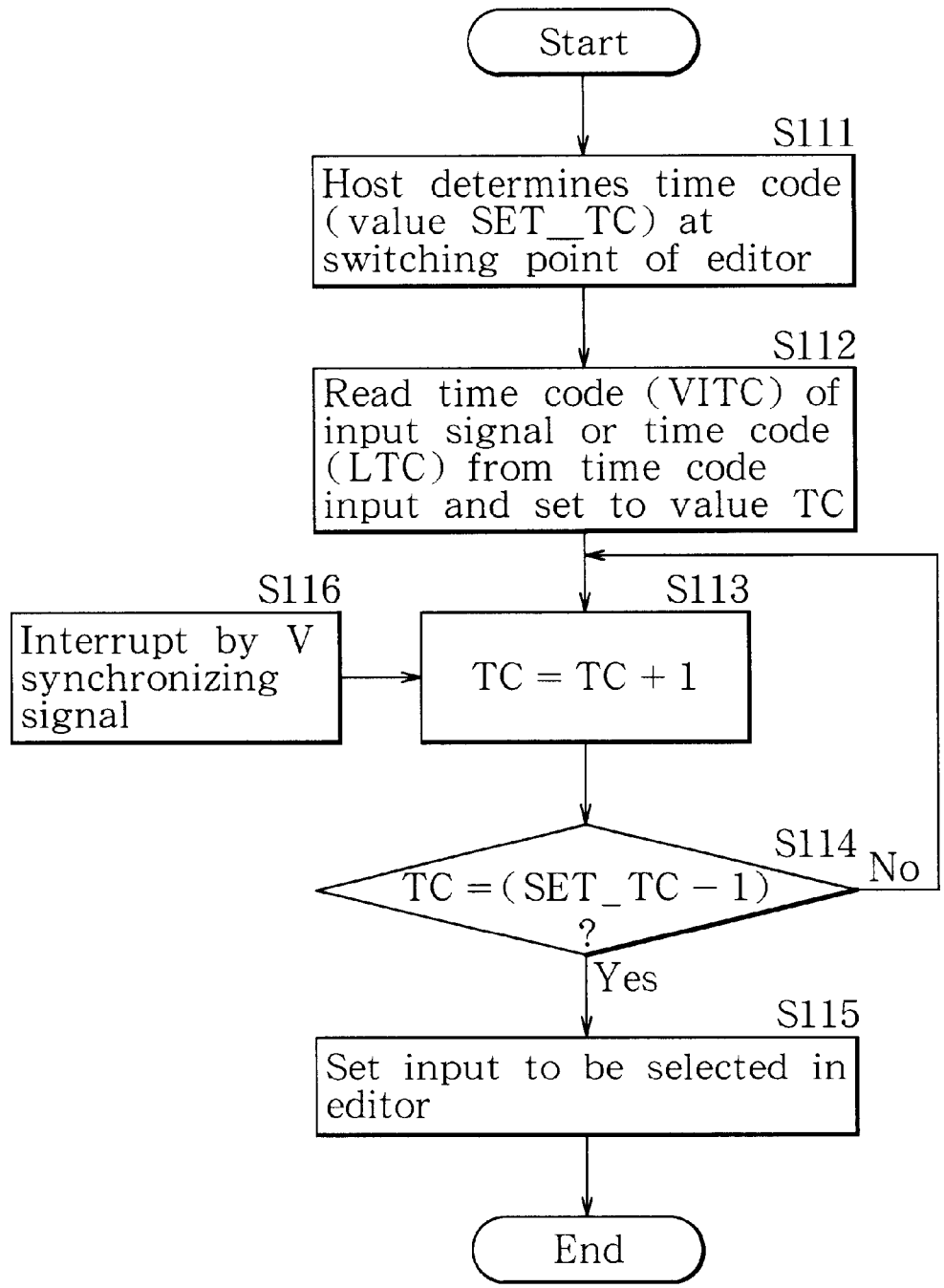
FIG. 19 is a flow chart of a procedure for setting the editor shown in FIG. 17.

FIG. 19 shows a procedure for switching the editor 51 in accordance with the time code of the data inputted from the time code detector 78A of the input port 60A. FIG. 20 shows a procedure for switching the selectors of the editor 51 in accordance with the time code of the data inputted from the time code detectors 78B to 78D of the output ports 60B to 60D. In this case, it is assumed that the time code inputted to the editor 51 is also inputted to the CPU 53.

In the processing in accordance with the input from the input port 60A, the CPU 53 that is a host system sets a value SET_TC of the time code at the switching point of the editor 51, as shown in step S111.

Then, in step S112, the time code (VITC) of the input signal or the time code (LTC,) from the time code input is read by the CPU 53, and the read value is set to a value TC.

Then, in step S113, the counter 516 counts the value TC up by 1 (TC=TC+1) each time an interrupt is caused by the V synchronizing signal (step S116). In step S114, whether or not the value TC equals to SET_TC−1 is determined Until the value TC equals to SET_TC−1, the counter 516 counts the value TC up by 1 each time the interrupt is caused by the V synchronizing signal. When the value TC equals to SET_TC−1, the processing goes on to step S115.

In step S115, the switcher controller 514 sets the input to be selected in each of the selectors of the editor 51.

Through such a procedure, the time code of a field to be switched is previously obtained. First, the time code of the input is once read, and the counter counts the value TC up each time the interrupt is caused by the V synchronizing signal. When a predetermined time code is inputted, the input is set in each of the selectors of the editor 51. Since it is necessary to perform the setting one field earlier, 1 is subtracted from the value SET_TC in the determination for the time code in step S114.

Figure 20:
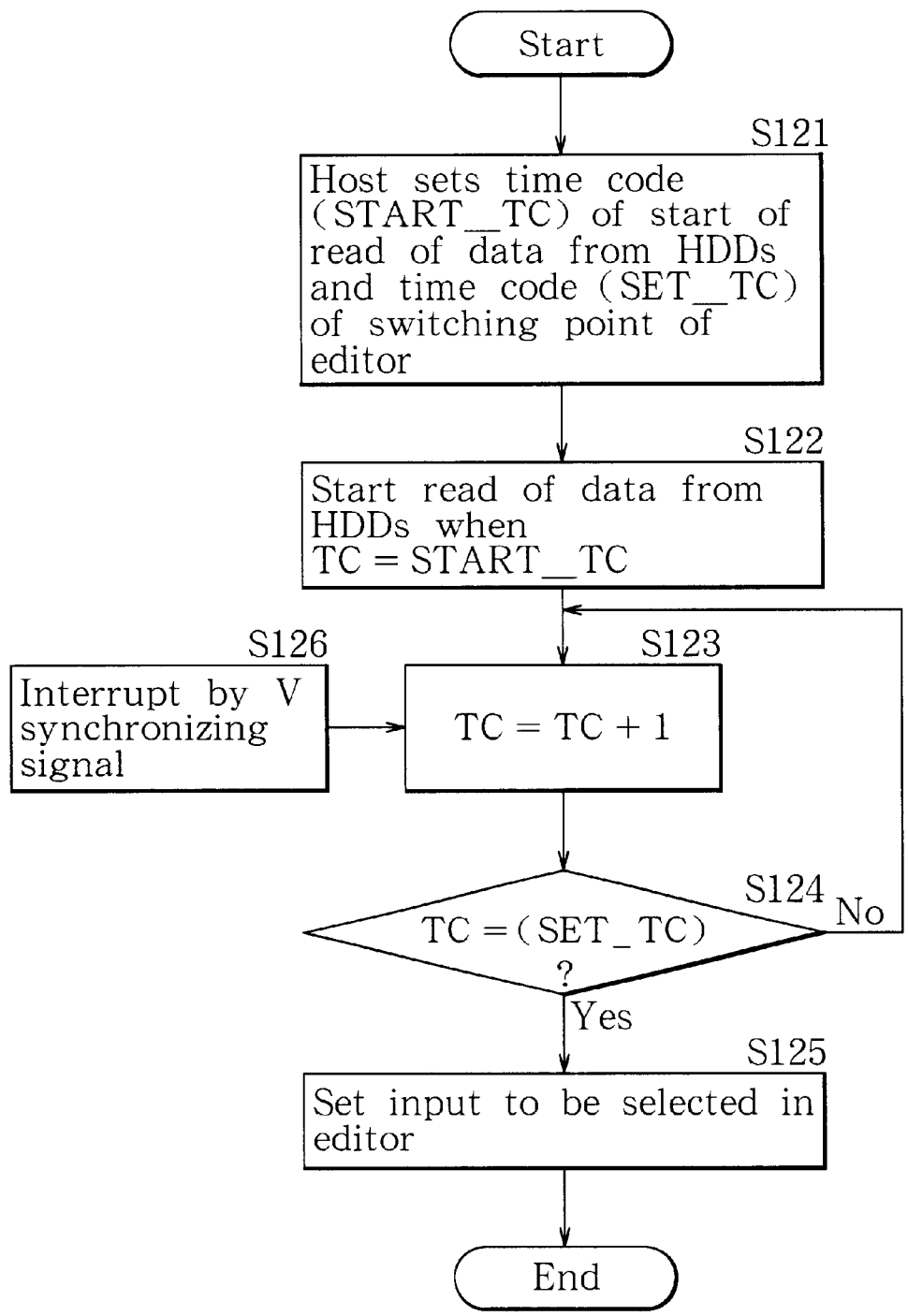
FIG. 20 is another flow chart of a procedure for setting the editor shown in FIG. 17.
Figure 21:
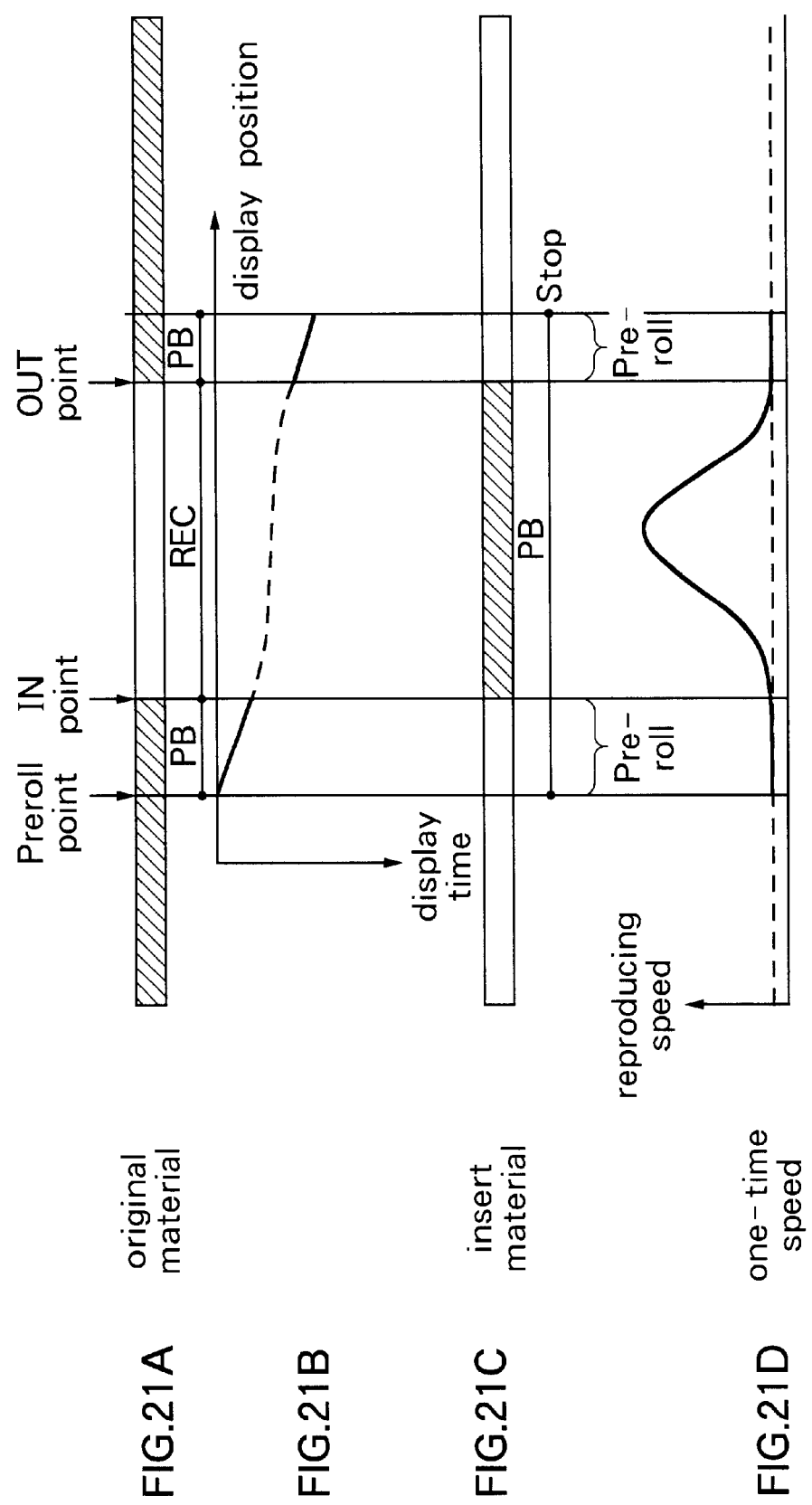
FIGS. 21A to 21D are graphical representations for explaining reproduction by the data recording and reproducing apparatus shown in FIG. 17.

In the processing in accordance with the inputs from the output ports 60B to 60D, as shown in FIG. 20, in step S121, the CPU 53 sets the time code (START_TC) of the start of read of the data on the HDDs 45 and 46 and the time code (SET_TC) of the switching point of the editor 51.

Then, in step S122, the read of the data on the HDDs 45 and 46 is started when the value TC equals to START_TC.

Then, in step S123, the counter 516 counts the value TC up by 1 (TC=TC+1) each time the interrupt is caused by the V synchronizing signal (step S126). In step S124, whether or not the value TC equals to SET_TC is determined.

Until the value TC equals to SET_TC, the counter 516 counts the value TC up by 1 each time the interrupt is caused by the V synchronizing signal. When the value TC equals to SET_TC, the processing goes on to step S125.

In step S125, the switcher controller 514 sets the input to be selected in each selector of the editor 51.

Through such a procedure, each selector of the editor 51 is switched in accordance with the time code of the data inputted from the output ports 60B to 60D.

The data recording and reproducing apparatus 1 has the above-described configuration, whereby the data recording and reproducing apparatus 1 can apply cutting and special effect processing to the data from the input port 60A and the output ports 60B to 60D. The data recording and reproducing apparatus 1 can again input the data, which is subjected to cutting and special effect processing, to the input port 60A and the output ports 60B to 60D. Furthermore, the apparatus 1 can output the edited data to the monitor (not shown).

In most of the conventional configurations, data cannot be instantaneously switched between ports because the data is transmitted to a data bus by time division multiplexing or the data is buffered by a buffer of the port for processing such as jog, a buffer required for encoders and decoders, a buffer for processing data on the HDD, or the like.

The data recording and reproducing apparatus 1 is provided with the editor 51. Therefore, the data recording and reproducing apparatus 1 can switch the data in each port, and thus can instantaneously switch the data between ports. For example, the editor 51 routes the output from the decoder 63 of the output port 60B to the switch 74 of the output port 60C and the editor 51 routes the output from the decoder 72 of the output port 60C to the switch 65 of the output port 60B, whereby the output from the output port 60B and the output from the output port 60C can be switched.

In the data recording and reproducing apparatus 1 which the present invention is applied to, the editor 51 can perform the cutting function. Thus, cutting can be performed without the use of an effecter circuit or the like. Cutting can be accomplished in the following manner: the input is connected to the output through editing or the outputs are connected to one another through editing, and the edited data are reproduced, recorded, or simultaneously reproduced and recorded. Furthermore, the data recording and reproducing apparatus 1 is inexpensive and can centralize time management, as compared to an apparatus requiring external edit facilities. Therefore, the data recording and reproducing apparatus 1 also has an advantage of easy controlling.

Moreover, a plurality of ports can be switched in the data recording and reproducing apparatus 1. Thus, the data recording and reproducing apparatus 1 has effecter functions therein, whereby the data recording and reproducing apparatus 1 can easily perform various types of special effect processing such as keying, transition or picture-in-picture by an optional combination of ports.

Next, the description of editing performed by the data recording and reproducing apparatus 1 having the above-described configuration will be given below . The data recording and reproducing apparatus can perform editing of the same quality as editing performed by a linear editing machine such as a conventional VCR. Additionally, at the time of editing, the data recording and reproducing apparatus 1 reproduces data in real time near the edit point and reproduces data in a time shorter than the real time within an edit section except for the neighborhood of the edit point. Although editing is performed as described above, editing will be described below by taking cutting in the editor 51 as an example, with reference to FIGS. 21A to 23C.

FIGS. 21A to 21D shows the processing for cutting that is made possible by switching the images. FIG. 21A shows an original material. FIG. 21C shows an insert material including the image to be inserted by the cutting.

Cutting refers to inserting another image into the original material by cut switching. The inserted image is an image included in the insert material composed of other pictures, for example. The description given below is an example of cutting, which is performed by reproducing the original material by the output port 60B and reproducing the insert material by the output port 60C.

In cutting, as shown in FIG. 21A, the edit point is determined by the IN point (cut-in point) and the OUT point (cut-out point). The IN point indicates the point for switching from the original material to the insert material, and the OUT point indicates the point for switching from the insert material to the original material. The IN point and the OUT point are previously determined in the original material and the insert material. In the original material, the IN point is the point at which the insertion of the other image by switching is started, and the OUT point is the point at which the insertion of the other image ends. In the insert material, the section between the IN point and the OUT point indicates a range of the image to be inserted into an original image by the cut switching.

The IN point and the OUT point of the original material and the insert material are previously determined by operating the data recording and reproducing apparatus 1 in the following manner.

First, an operator operates the control panel 4, thereby selecting the output port for use in the reproducing of the original material. The operator manipulates an operating button on the control panel 4, thereby starting the reproducing of the original material by the selected output port. Specifically, the operator presses the port select switches 16 (see FIG. 3) on the control panel 4, whereby the command indicating which output port is selected is outputted from the control panel 4. This command is transmitted to the control bus 37 through the I/F 42 of the timing manager 31 by the CPU (not shown) of the timing manager 31. The command is inputted to the CPU 53 of the controller 36 through the control bus 37. For example, when the CPU 53 receives the command to select the output port 60B, the CPU 53 issues to the CPU 34B of the output port 60B the control signal indicating that the output port 60B is selected, whereby the CPU 53 controls the output port 60B. Then, the operator presses the switch 25 (see FIG. 3) on the control panel 4, whereby the command to reproduce data from the HDDs 45 and 46 is outputted from the control panel 4. This command is transmitted to the control bus 37 through the I/F 42 of the timing manager 31 by the CPU (not shown) of the timing manager 31. The command is inputted to the CPU 53 of the controller 36 through the control bus 37. When the CPU 53 receives this command, the CPU 53 transmits the control signal instructing the HDDs 45 and 46 to reproduce data, to the HDDs 45 and 46 through the control bus 37. Thus, the original material is read out from the HDDs 45 and 46, and the read original material is outputted to the monitor through the controller 36. Then, the operator manipulates the operating button on the control panel 4 while checking the image outputted to the monitor, whereby the operator determines the IN point and the OUT point. The data recording and reproducing apparatus 1 is operated in this manner, whereby the IN point and the OUT point of the original material are determined. The operator determines the IN point and the OUT point of the insert material by the same operation as the operation for the original material.

For example, the IN point and the OUT point, which are thus given to the original material and the insert material, are stored in the RAM or the like controlled by the CPU 53 of the controller 36, as edit point information.

After the IN point and the OUT point of the original material and the insert material are thus determined, preview for cutting can be performed. For example, a preview button on the control panel 4 is manipulated, whereby preview for cutting is started. That is, the preview button on the control panel 4 is manipulated, whereby a preview command is sent to the CPU 53 of the controller 36 and thus preview is started.

Next, a file system which performs the management of the file recorded on the HDDs 45 and 46 will be described. The file system is stored in storing means (not shown) of the file manager 43 of the information manager 32, and the file system manages the information of the file recorded on the HDDs 45 and 46.

Figure 24A:
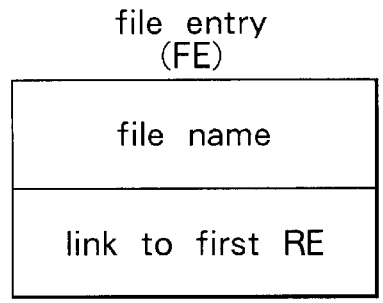
FIG. 24A is a schematic diagram of a file entry (FE)
Figure 24B:
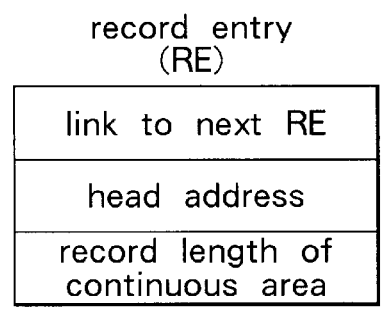
FIG. 24B is a schematic diagram of a record entry (RE)
Figure 24C:
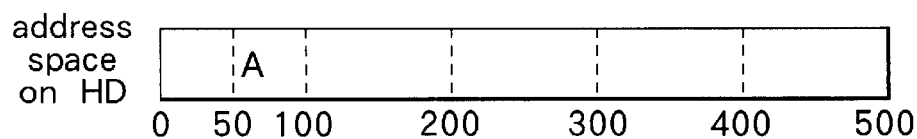
FIG. 24C is a schematic diagram of an address space of HD.
Figure 24D:
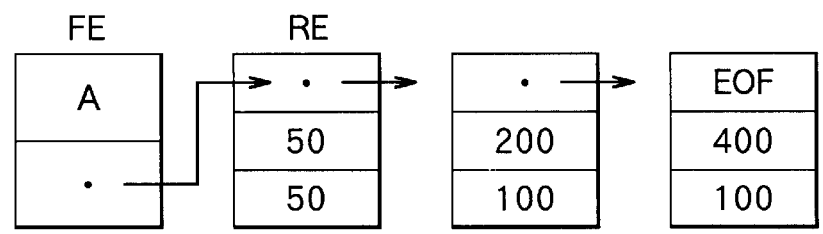
FIG. 24D is a schematic diagram of a structure of information of a file system stored in a file manager shown in FIG. 1.

Specifically, as shown in FIGS. 24A and 24B, the file system mainly comprises a file entry (FE) and a record entry (RE). The file entry comprises a file name of the file recorded on the HDDs 45 and 46, and the information on a pointer to a target which the first record entry is linked to. The record entry comprises a head address value on the HDD on which the file is recorded, a record length of a continuous record from this address, and a pointer to the next RE. For example, when a file "A" is recorded in an address space of the HD as shown in FIG. 24C, the information of the file system stored in the file manager 43 is constituted as shown in FIG. 24D. That is, the file entry (FE) is composed of the file name "A" and the information on the pointer to the next record entry (RE) (the first entry). In the record entry (RE), the head address of the first continuous area is "50", the record length of the continuous area is "50", the file "A" is discretely recorded on the HDD, the next head address is "200", the record length thereof is "100", the further next head address is "400", and the record length thereof is "100". "EOF" is written because no pointer to the record entry exists.

Since both of the original material and the insert material are recorded on the HDDs 45 and 46, the above-described file system is stored in the file manager 43.

Next, the information on the file system of the original material is updated in accordance with the information on the positions of the IN point and the OUT point of the original material obtained by operating the control panel 4. In this case, the IN point and the OUT point are stored in the CPU 53 of the controller 36.

Figure 25A:
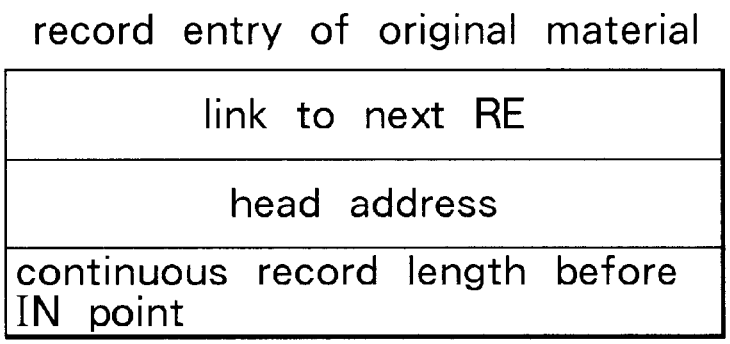
FIG. 25A is a schematic diagram of the record entry of an original material.

To update the file system information, the information on the record length shown in FIG. 24B is changed to the information on the length before the IN point in accordance with the information on the IN point, as shown, in FIG. 25A.

As to the insert material, as shown in FIG. 25A, the information on the head address is changed to the information on the address on the HD of the IN point of the insert material corresponding to the IN point of the original material on the assumption that the insert material starts at the point corresponding to the IN point of the original material. Moreover, the information on the record length is changed to the information on the length before the position of the insert material corresponding to the OUT point of the original material.

Figure 25B:
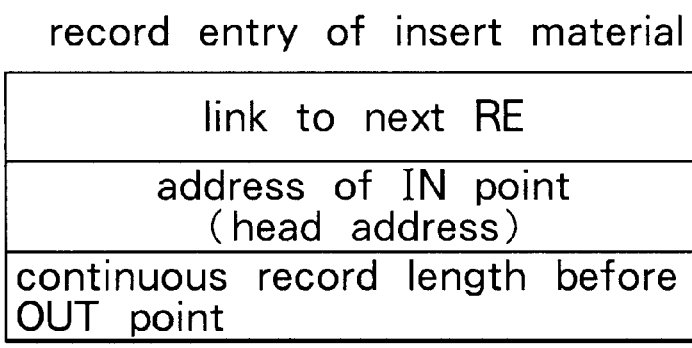
FIG. 25B is a schematic diagram of the record entry of an insert material.
Figure 25C:
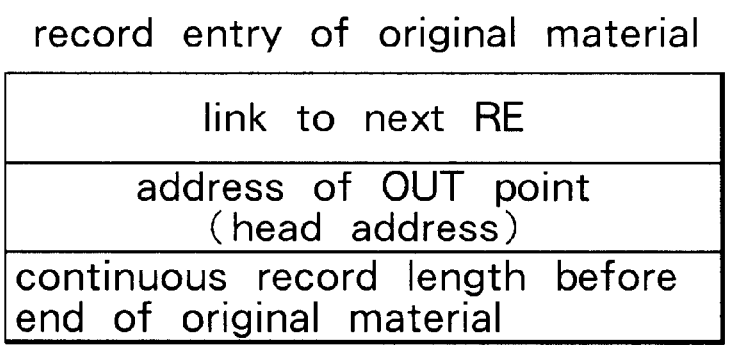
FIG. 25C is a schematic diagram of the record entry of the original material.

Then, the file system information indicating that the original material again 'starts at and continues from the OUT point of the original material is updated and created, as shown in FIG. 25C. That is, the information on the head address is changed to the information on a start address on the HD corresponding to the OUT point of the original material. Moreover, the information on the record length is changed to the information on the length before the end of the original material.

Figure 22:
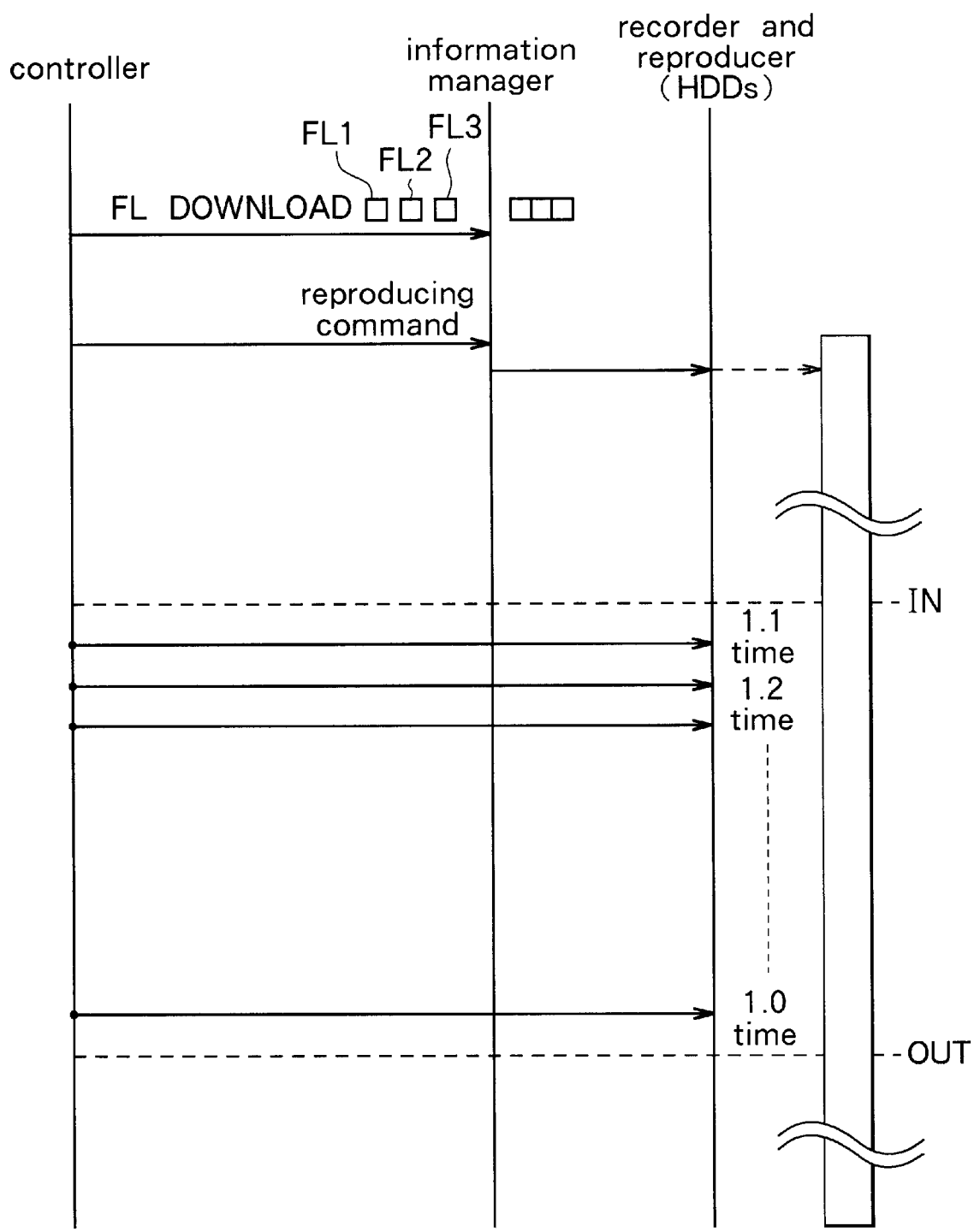
FIG. 22 is a diagram for explaining editing by the data recording and reproducing apparatus shown in FIG. 17.

Then, each of the file system information thus updated is transferred from the CPU 53 of the controller 36 to the information manager 32 as file system information FL1, FL2 and FL3, as shown in FIG. 22.

Then, the reproducing command is transmitted from the CPU 53 of the controller 36 to the information manager 32, as shown in FIG. 22.

The information manager 32 creates new file system information linking the file system information FL1, FL2 and FL3 in accordance with the command from the CPU 53 of the controller 36.

Specifically, the information on the link to the next RE of FIG. 25A is changed to the record entry of the insert material shown in FIG. 25B. The information on the link to the next RE of the insert material shown in FIG. 25B is linked to the record entry corresponding to the OUT point of the original material shown in FIG. 25C.

By this processing, the cut data is newly created as the file system. That is, the data recording and reproducing apparatus 1 performs cutting only by copying and referring to the file.

Preview is actually started in accordance with the file system thus created.

In actual preview, a command is transmitted from the information manager 32 to the HDDs 45 and 46 through the bus 37 and the recorder and reproducer 33 in accordance with the file system created as described above. That is, in accordance with the file system information held by the information manager 32, the information manager 32 refers to the file system to see at which location on the HDDs 45 and 46 the file (material) to be read is located. Then, the address information and so on are inserted into the command and the command is transferred to the recorder and reproducer 33, whereby data is reproduced from the HDDs 45 and 46 on which the file to be read is recorded.

When the recorder and reproducer 33 receives this reproducing command, the recorder and reproducer 33 reads out data from a desired location on the HDDs 45 and 46 and then transmits the original material to the output port 60B.

On the other hand, as described above, the CPU 53 of the controller 36 transmits the reproducing command to the HDDs 45 and 46 and also transmits the command to the CPU 34B of the output port 60B. Thus, the output port 60B is in a conditon in which the output port 60B can receive the original material read from the HDDs 45 and 46.

Since the reproducing command is thus transmitted to the HDDs 45 and 46 and the output port 60B, the data is read from the HDDs 45 and 46 and the data read from the HDDs 45 and 46 is inputted to the output port 60B through the data bus 30. The data inputted to the output port 60B is decoded by the decoder 63, and the decoded data is inputted to the editor 51. Then, the original material inputted to the editor 51 is outputted to the monitor by the monitor selector 521 (see FIG. 17) in the editor 51. This output of the original material to the monitor is executed until the output reaches the IN point.

In this case, a reproducing speed of the original material is the real time of the data. The reproducing speed is determined by the command which the CPU 53 of the controller 36 issues to the recorder and reproducer 33.

When the original material is reproduced beyond the IN point, the original material is cut and switched and the reproducing of the insert material is started in the same way as the above-described way. That is, the controller 36 issues the command to the information manager 32. Then, the information manager 32 outputs the command to the recorder and reproducer 33 in accordance with the new file system information so that data may be reproduced from the HDDs 45 and 46 on which the file is recorded. When the recorder and reproducer 33 receives this reproducing command, the recorder and reproducer 33 reads out data from the desired location on the HDDs 45 and 46 and then transmits the insert material to the output port 60B.

The insert material starting at the IN point is reproduced at high speed. As to high-speed reproducing, a double-speed command is issued from the controller 36 to the recorder and reproducer 33 at equal interval, that is, frame by frame, second by second and the recorder and reproducer 33 reads out data recorded in the HDDs 45 and 46 in accordance with this command. For example, in the case of the double speed, it is possible that data is read at intervals of two frames.

The reproducing speed of the insert material from the IN point to the OUT point is changed as shown in FIG. 21D. The reproducing speed increases as data is farther from the IN point. The reproducing speed reaches a peak near the center between the IN point and the OUT point. Then, as data is closer to the OUT point, the reproducing speed is reduced to the real-time, namely, a one-time speed. The reproducing speed of the insert material between the IN point and the OUT point is smoothly accelerated and decelerated. For example, as shown in FIG. 22, the controller 36 transmits to the recorder and reproducer 33 the command to change the reproducing speed to the 1.1-time, 1.2-time, . . . , speed.

The reproducing speed of the insert material is determined by the command issued from the CPU 53 of the controller 36 to the recorder and reproducer 33.

Similarly to the original material, the insert material within this section is outputted to the monitor. That is, the insert material read out from the HDDs 45 and 46 is inputted to the editor 51 via the output port 60B. Then, the insert material inputted to the editor 51 is outputted to the monitor through an external output terminal (not shown). This output of the insert material to the monitor is executed until the output reaches the OUT point.

Furthermore, the CPU 53 controls the read of data from the HDDs 45 and 46 so that the reproducing speed may be smoothly accelerated and decelerated. For example, the CPU 53 transmits to the recorder and reproducer 33 the command to smoothly increase and reduce the reproducing speed.

When the insert material is reproduced beyond the OUT point, the original material is again reproduced in the same way as the above-described way.

The insert material is reproduced at high speed in the edit section between the IN point and the OUT point, whereby as shown in FIG. 21B, a rate of increase, of the display time versus the display position between the IN point and the OUT point is lower than that before the IN point and after the OUT point.

FIG. 23 shows a result of the one-time-speed reproducing over all the sections including the section between the IN point and the OUT point. FIG. 21B clearly shows that the display time is reduced compared to the result of FIG. 23B.

For editing using a conventional VCR equipment, there are provided a Preroll section for matching the original material to the insert material and a Postroll section which is a fixed section after the OUT point. This concept may be introduced into the data recording and reproducing apparatus 1. That is, a predetermined section before the IN point may be set as the Preroll section, and a predetermined section after the OUT point may be set as the Postroll section.

Moreover, the special effecter 39 can perform special effect processing near the IN point or the OUT point. In this case, the original material or the insert material, which is inputted from the output port 60B or 60C to the editor 51, is outputted to the special effecter 39 by the editor 51. Then, the material is subjected to special effect processing by the special effecter 39. Then, the material is inputted to the input port 60A through the editor 51, the material is compressed and encoded by the input port 60A, and the material is again recorded on the HDDs 45 and 46.

Simultaneously with special effect processing, the edited material can be displayed on the monitor. In this case, the section subjected to special effect processing is reproduced at one-time speed, and the other sections are reproduced at the speed smoothly accelerated and decelerated. In this case, the whole edited data is obtained through editing on the file system the original material, the insert material at one-time speed and the result of processing by the special effecter 39 which is processed by an encoder.

As described above, the data recording and reproducing apparatus 1 operates like a conventional VCR equipment, thereby executing editing.

That Is, the data recording and reproducing apparatus 1 can reproduce data near the edit point at the time of cutting. Thus, the operator can cut and edit the original material and the insert material only by copying and referring to the file. Moreover, the operator can perform preview at the time of editing by the operation like the operation of the conventional VCR.

Moreover, the data recording and reproducing apparatus 1 reproduces other section than the section near the edit point, e.g., the section between the IN point and the OUT point at high speed. Thus, even if the editor intensively edits the edit point, the other sections having no influence on the cutting are reproduced at high speed and therefore the preview time can be reduced. For example, the section to be reproduced at high speed is not limited to the section between the IN point and the OUT point. Sections before the section near the IN point and after the section near the OUT point, i.e., the original material can be also reproduced at high speed. Thus, the preview time can be further reduced.

Furthermore, the data recording and reproducing apparatus 1 smoothly accelerates and decelerates the reproducing speed at the time of high-speed reproducing of the section between the IN point and the OUT point. Thus, the operator can perform preview without feeling of inconvenience of operation.

In the above-described embodiment, HDs are used as recording media of the data recording and reproducing apparatus 1. However, a disk-like recording medium such as MO or DVD or a semiconductor memory such as D-RAM or a flash memory may be used as a recording medium.

Obviously many modifications and variations of the present invention are possible in the light of the above teachings. It is therefore to be understood that within the scope of the appended claims the invention may be practiced otherwise than as specifically described.

What is claimed is:

1. A data recording and reproducing apparatus wherein data reproduced by external equipment is inputted to an input port, comprising:

recording and reproducing means for recording and reproducing data by using a nonlinear-accessible recording medium;

input and output means having at least one input port for inputting data and at least one output port for outputting data, the input and output means being capable of making time division access to the recording and reproducing means;

editing means for editing data by using at least either data inputted from the input port or data reproduced by the recording and reproducing means; and controlling means for controlling the external equipment or the recording medium so as to advance the time to reproduce data from the external equipment or the recording medium, in consideration of a magnitude of delay that occurs until data reproduced by the external equipment or the recording medium is inputted to the editing means, from the time in a case in which the magnitude of delay is not taken in consideration, when the editing means edits data by using data inputted from the input port and data reproduced by the recording and reproducing means.

2. A data recording and reproducing apparatus according to claim 1 further comprising indicating means to which data inputted to or outputted from the editing means is inputted, the indicating means for providing indications as to the input data.

3. A data recording and reproducing apparatus according to claim 2, wherein the indicating means has an indicator for indicating an operating status of each of the input ports and the output ports of the input and output means.

4. A data recording and reproducing apparatus according to claim 1, wherein the editing means has an operation console at which operations of editing are performed.

5. A data recording and reproducing apparatus according to claim 1, wherein the editing means performs editing independently of processing performed by the input and output means.

6. A data recording and reproducing apparatus according to claim 1, wherein the recording and reproducing means records and reproduces data by using a plurality of recording media.

7. A data recording and reproducing apparatus according to claim 1 further comprising routing means for switching input and output routes for data inputted from the input port and data reproduced by the recording and reproducing means in accordance with the effect of editing.

8. A data recording and reproducing apparatus according to claim 1 further comprising storing means for storing the magnitude of delay.

9. A data recording and reproducing apparatus according to claim 1, wherein information on an edit point at which editing is to be performed by the editing means is given in a time code accompanying data inputted from the input port or data reproduced by the recording and reproducing means.

10. A data recording and reproducing apparatus according to claim 9 further comprising time code detecting means for detecting the time code.

11. A data recording and reproducing apparatus according to claim 9 further comprising storing means for storing the time code.

12. A data recording and reproducing apparatus according to claim 7 further comprising special effect processing means for applying special effect processing to input data, wherein data to be subjected to special effect processing is inputted to the special effect processing means through the input and output means and the editing means in accordance with the route set by the routing means, and data subjected to special effect processing by the special effect processing means is outputted to the input and output means through the editing means in accordance with the route set by the routing means.

13. A data recording and reproducing apparatus comprising:

recording and reproducing means for recording and reproducing data by using a nonlinear-accessible recording medium;

input and output means having at least one input port for inputting data and at least one output port for outputting data, the input and output means being capable of making time division access to the recording and reproducing means;

editing means for editing data by using at least either data inputted from the input port or data reproduced by the recording and reproducing means; and routing means for switching input and output routes for data inputted from the input port and data reproduced by the recording and reproducing means in accordance with the effect of editing, wherein the routing means has a cutting portion for selecting and cutting data inputted from the input port and data reproduced by the recording and reproducing means.

14. A data recording and reproducing apparatus according to claim 13 further comprising switch controlling means for switching data selection mode in the cutting portion in accordance with a synchronizing signal given to data inputted to the routing means.

15. A data recording and reproducing apparatus according to claim 13 further comprising output selecting means for selectively supplying data cut by the cutting portion to the input port and the output port.

16. A data recording and reproducing apparatus according to claim 13 further comprising:

image display means for displaying an image in accordance with input data; and output selecting means for selectively supplying data cut by the cutting portion to the image display means.

17. A data recording and reproducing apparatus comprising:

recording and reproducing means for recording and reproducing data by using a nonlinear-accessible recording medium;

input and output means having at least one input port for inputting data and at least one output port for outputting data, the input and output means being capable of making time division access to the recording and reproducing means;

editing means for editing data by using at least either data inputted from the input port or data reproduced by the recording and reproducing means;

routing means for switching input and output routes for data inputted from the input port and data reproduced by the recording and reproducing means in accordance with the effect of editing; and special effect processing means for applying special effect processing to input data, wherein the routing means has a data selector for selectively supplying data inputted from the input port and data reproduced by the recording and reproducing means to the special effect processing means.

18. A data recording and reproducing apparatus according to claim 17 further comprising switch controlling means for switching data selection mode in the data selector in accordance with a synchronizing signal given to data inputted to the routing means.

19. A data recording and reproducing apparatus according to claim 17 further comprising output selecting means for selectively supplying data subjected to special effect processing by the special effect processing means to the input port and the output port.

20. A data recording and reproducing apparatus according to claim 17 further comprising:

image display means for displaying an image in accordance with input data; and output selecting means for selectively supplying data subjected to special effect processing by the special effect processing means to the image display means.

21. A data recording and reproducing apparatus comprising:

recording and reproducing means for recording and reproducing data by using a nonlinear-accessible recording medium;

input and output means having at least one input port for inputting data and at least one output port for outputting data, the input and output means being capable of making time division access to the recording and reproducing means;

editing means for editing data by using at least either data inputted from the input port or data reproduced by the recording and reproducing means;

image display means for displaying an image in accordance with input data; and routing means for switching input and output routes for data inputted from the input port and data reproduced by the recording and reproducing means in accordance with the effect of editing, wherein the routing means has a data selector for selectively supplying data inputted from the input port and data reproduced by the recording and reproducing means to the image display means.

22. A data recording and reproducing apparatus according to claim 21 further comprising switch controlling means for switching data selection mode in the data selector in accordance with a synchronizing signal given to data inputted to the routing means.

23. A data recording and reproducing apparatus comprising:

recording and reproducing means for recording and reproducing data by using a nonlinear-accessible recording medium;

input and output means having at least one input port for inputting data and at least one output port for outputting data, the input and output means being capable of making time division access to the recording and reproducing means;

editing means for editing data by using at least either data inputted from the input port or data reproduced by the recording and reproducing means; and controlling means for controlling the recording and reproducing means so that data to be edited recorded on the recording medium may be reproduced in real time near a switching point at which data to be edited is switched and so that data to be edited may be reproduced in a time shorter than the real time at other sections than the section near the switching point, when the editing means edits data by using first and second data reproduced from the recording medium.

24. A data recording and reproducing apparatus according to claim 23, wherein the controlling means controls the recording and reproducing means so that data to be edited may be reproduced at high speed in a time shorter than the real time at other sections than the section near the switching point.

25. A data recording and reproducing apparatus according to claim 24, wherein the controlling means controls the recording and reproducing means so as to smoothly change the reproducing speed of data to be edited and so as to increase the reproducing speed of data to be edited as data is farther from the switching point.

26. A data recording and reproducing apparatus comprising:
- recording and reproducing means for recording and reproducing data by using a nonlinear-accessible recording medium;
- input and output means having at least one input port to which data reproduced by external equipment is inputted and at least one output port for outputting data, the input and output means being capable of making time division access to the recording and reproducing means;
- editing mean for editing data by using at least either data inputted from the input port or data reproduced by the recording and reproducing means; and
- controlling means for controlling the external equipment or the recording medium so as to advance the time to reproduce data from the external equipment or the recording medium, in consideration of a magnitude of delay that occurs until data reproduced by the external equipment or the recording medium is inputted to the editing means, from the time in a case in which the magnitude of delay is not taken in consideration, when the editing means edits data by using data inputted from the input port and data reproduced by the recording and reproducing means.

27. A data recording and reproducing apparatus comprising:
- recording and reproducing means for recording and reproducing data by using a nonlinear-accessible recording medium;
- input and output means having at least one input port to which data reproduced by external equipment is inputted and at least one output port for outputting data, the input and output means being capable of making time division access to the recording and reproducing means;
- editing means for editing data by using at least either data inputted from the input port or data reproduced by the recording and reproducing means; and
- routing means for switching input and output routes for data inputted from the input port and data reproduced by the recording and reproducing means in accordance with the effect of editing,
- wherein the routing means has a cutting portion for selecting and cutting data inputted from the input port and data reproduced by the recording and reproducing means.

28. A data recording and reproducing apparatus comprising:
- recording and reproducing means for recording and reproducing data by using a nonlinear-accessible recording medium;
- input and output means having at least one input port for inputting data and at least one output port for outputting data, the input and output means being capable of making time division access to the recording and reproducing means;
- editing means for editing data by using at least either data inputted from the input port or data reproduced by the recording and reproducing means;
- routing means for switching input and output routes for data inputted from the input port and data reproduced by the recording and reproducing means in accordance with the effect of editing; and
- special effect processing means for applying special effect processing to input data,
- wherein the routing means has a data selector for selectively supplying data inputted from the input port and data reproduced by the recording and reproducing means to the special effect processing means.

29. A data recording and reproducing apparatus comprising:
- recording and reproducing means for recording and reproducing data by using a nonlinear-accessible recording medium;
- input and output means having at least one input port for inputting data and at least one output port for outputting data, the input and output means being capable of making time division access to the recording and reproducing means;
- editing means for editing data by using at least either data inputted from the input port or data reproduced by the recording and reproducing means;
- routing means for switching input and output routes for data inputted from the input port and data reproduced by the recording and reproducing means in accordance with the effect of editing; and
- image display means for displaying an image in accordance with input data,
- wherein the routing means has a data selector for selectively supplying data inputted from the input port and data reproduced by the recording and reproducing means to the image display means.

30. A data recording and reproducing apparatus comprising:
- recording and reproducing means for recording and reproducing data by using a nonlinear-accessible recording medium;
- input and output means having at least one input port for inputting data and at least one output port for outputting data, the input and output means being capable of making time division access to the recording and reproducing means;
- editing means for editing data by using at least either data inputted from the input port or data reproduced by the recording and reproducing means; and
- controlling means for controlling the recording and reproducing means so that data to be edited recorded on the recording medium may be reproduced in real time near a switching point at which data to be edited is switched and so that data to be edited may be reproduced in a time shorter than the real time at other sections than the section near the switching point, when the editing means edits data by using first and second data reproduced from the recording medium.

31. A data editing method through the use of a data recording and reproducing apparatus comprising:

recording and reproducing means for recording and reproducing data by using a nonlinear-accessible recording medium;

input and output means having at least one input port for inputting data and at least one output port for outputting data, the input and output means being capable of making access to the recording and reproducing means; and editing means for editing data by using at least either data inputted from the input port or data reproduced by the recording and reproducing means, wherein the input and output means makes time division access to the recording and reproducing means; and wherein data reproduced by external equipment is inputted to the input port, and the external equipment or the recording medium is controlled so as to advance the time to reproduce data from the external equipment or the recording medium, in consideration of a magnitude of delay that occurs until data reproduced by the external equipment or the recording medium is inputted to the editing means, from the time in a case in which the magnitude of delay is not taken in consideration, when the editing means edits data by using data inputted from the input port and data reproduced by the recording and reproducing means.

32. A data editing method according to claim 31, wherein routing means switches input and output routes for data inputted from the input port and data reproduced by the recording and reproducing means in accordance with the effect of editing.

33. A data editing method according to claim 31, wherein the magnitude of delay is previously stored prior to editing of data.

34. A data editing method according to claim 31, wherein information on an edit point at which editing is to be performed by the editing means is given in a time code accompanying data inputted from the input port or data reproduced by the recording and reproducing means.

35. A data editing method according to claim 34, wherein the time code is detected in order to perform editing.

36. A data editing method according to claim 34, wherein the time code is previously stored prior to editing of data.

37. A data editing method according to claim 32 wherein the data to be subjected to special effect processing is outputted to special effect processing means for applying special effect processing to input data, through the input and output means and the editing means in accordance with the route set by the routing means, and data subjected to special effect processing by the special effect processing means is outputted to the input and output means through the editing means in accordance with the route set by the routing means.

38. A data editing method through the use of a data recording and reproducing apparatus comprising:

recording and reproducing means for recording and reproducing data by using a nonlinear-accessible recording medium;

input and output means having at least one input port for inputting data and at least one output port for outputting data, the input and output means being capable of making access to the recording and reproducing means; and editing means for editing data by using at least either data inputted from the input port or data reproduced by the recording and reproducing means, wherein the input and output means makes time division access to the recording and reproducing means; and wherein the recording and reproducing means is controlled so that data to be edited recorded on the recording medium may be reproduced in real time near a switching point at which data to be edited is switched and so that data to be edited may be reproduced in a time shorter than the real time at other sections than the section near the switching point, when the editing means edits data by using first and second data reproduced from the recording medium.

39. A data editing method according to claim 38 wherein the recording and reproducing means is controlled so that data to be edited may be reproduced at high speed in a time shorter than the real time at other sections than the section near the switching point.

40. A data editing method according to claim 39, wherein the recording and reproducing means is controlled so as to smoothly change the reproducing speed of data to be edited and so as to increase the reproducing speed of data to be edited as data is farther from the switching point.

41. A data editing method through the use of a data recording and reproducing apparatus comprising:

recording and reproducing means for recording and reproducing data by using a nonlinear-accessible recording medium;

input and output means having at least one input port to which data reproduced by external equipment is inputted and at least one output port for outputting data, the input and output means being capable of making time division access to the recording and reproducing means; and editing means for editing data by using at least either data inputted from the input port or data reproduced by the recording and reproducing means, wherein the external equipment or the recording medium is controlled so as to advance the time to reproduce data from the external equipment or the recording medium, in consideration of a magnitude of delay that occurs until the data reproduced by the external equipment or the recording medium is inputted to the editing means, from the time in a case in which the magnitude of delay is not taken in consideration, when the editing means edits data by using data inputted from the input port and data reproduced by the recording and reproducing means.

42. A data editing method through the use of a data recording and reproducing apparatus comprising:

recording and reproducing means for recording and reproducing data by using a nonlinear-accessible recording medium;

input and output means having at least one input port to which data reproduced by external equipment is inputted and at least one output port for outputting data, the input and output means being capable of making time division access to the recording and reproducing means;

editing means for editing data by using at least either data inputted from the input port or data reproduced by the recording and reproducing means; and routing means for switching input and output routes for data inputted from the input port and data reproduced by the recording and reproducing means in accordance with the effect of editing, wherein editing is performed by selecting in a time-divided manner either data inputted from the input port or data reproduced by the recording and reproducing means.

43. A data editing method through the use of a data recording and reproducing apparatus comprising:

recording and reproducing means for recording and reproducing data by using a nonlinear-accessible recording medium;

input and output means having at least one input port for inputting data and at least one output port for outputting data, the input and output means being capable of making time division access to the recording and reproducing means;

editing means for editing data by using at least either data inputted from the input port or data reproduced by the recording and reproducing means;

routing means for switching input and output routes for data inputted from the input port and data reproduced by the recording and reproducing means in accordance with the effect of editing; and special effect processing means for applying special effect processing to input data, wherein the routing means selectively supplies data inputted from the input port and data reproduced by the recording and reproducing means to the special effect processing means.

44. A data editing method through the use of a data recording and reproducing apparatus comprising:

recording and reproducing means for recording and reproducing data by using a nonlinear-accessible recording medium;

input and output means having at least one input port for inputting data and at least one output port for outputting data, the input and output means being capable of making time division access to the recording and reproducing means;

editing means for editing data by using at least either data inputted from the input port or data reproduced by the recording and reproducing means;

routing means for switching input and output routes for data inputted from the input port and data reproduced by the recording and reproducing means in accordance with the effect of editing; and image display means for displaying an image in accordance with the input data, wherein the routing means selectively supplies data inputted from the input port or data reproduced by the recording and reproducing means to the image display means.

45. A data editing method through the use of a data recording and reproducing apparatus comprising:

recording and reproducing means for recording and reproducing data by using a nonlinear-accessible recording medium;

input and output means having at least one input port for inputting data and at least one output port for outputting data, the input and output means being capable of making access to the recording and reproducing means; and editing means for editing data by using at least either data inputted from the input port or data reproduced by the recording and reproducing means, wherein the recording and reproducing means is controlled so that data to be edited recorded on the recording medium may be reproduced in real time near a switching point at which data to be edited is switched and so that data to be edited may be reproduced in a time shorter than the real time at other sections than the section near the switching point, when the editing means edits data by using first and second data reproduced from the recording medium.

\* \* \* \* \*